United States Patent
Hirose et al.

(10) Patent No.: US 10,991,937 B2
(45) Date of Patent: Apr. 27, 2021

(54) NEGATIVE ELECTRODE ACTIVE MATERIAL, MIXED NEGATIVE ELECTRODE ACTIVE MATERIAL, AND METHOD FOR PRODUCING NEGATIVE ELECTRODE ACTIVE MATERIAL

(71) Applicant: SHIN-ETSU CHEMICAL CO., LTD., Tokyo (JP)

(72) Inventors: Takakazu Hirose, Annaka (JP); Hiromichi Kamo, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 199 days.

(21) Appl. No.: 16/091,305

(22) PCT Filed: Apr. 10, 2017

(86) PCT No.: PCT/JP2017/014626
§ 371 (c)(1),
(2) Date: Oct. 4, 2018

(87) PCT Pub. No.: WO2017/208624
PCT Pub. Date: Dec. 7, 2017

(65) Prior Publication Data
US 2019/0131618 A1 May 2, 2019

(30) Foreign Application Priority Data
May 30, 2016 (JP) .............................. JP2016-106936

(51) Int. Cl.
*H01M 4/36* (2006.01)
*C01B 33/32* (2006.01)
(Continued)

(52) U.S. Cl.
CPC ............. *H01M 4/364* (2013.01); *C01B 33/32* (2013.01); *H01M 4/36* (2013.01); *H01M 4/366* (2013.01);
(Continued)

(58) Field of Classification Search
CPC ........... H01M 2004/021; H01M 4/483; H01M 4/625; H01M 4/36; H01M 4/364;
(Continued)

(56) References Cited

U.S. PATENT DOCUMENTS

| 5,395,711 A | 3/1995 | Tahara et al. |
| 7,459,236 B2 | 12/2008 | Konishiike et al. |

(Continued)

FOREIGN PATENT DOCUMENTS

| CN | 103840136 A | 6/2014 |
| CN | 105024058 A | 11/2015 |

(Continued)

OTHER PUBLICATIONS

Mar. 3, 2020 Office Action issued in Japanese Patent Application No. 2018-520690.
(Continued)

*Primary Examiner* — Cynthia H Kelly
*Assistant Examiner* — Omar M Kekia
(74) *Attorney, Agent, or Firm* — Oliff PLC

(57) ABSTRACT

A negative electrode active material including a negative electrode active material particle, wherein the negative electrode active material particle includes a silicon compound particle comprising a silicon compound ($SiO_x$: $0.5 \leq x \leq 1.6$), the silicon compound particle includes crystalline $Li_2SiO_3$ and $Li_2Si_2O_5$ in at least part of the silicon compound particle, among a peak intensity A derived from $Li_2SiO_3$, a peak intensity B derived from Si, a peak intensity C derived from $Li_2Si_2O_5$, and a peak intensity D derived from $SiO_2$ (Continued)

which are obtained from a $^{29}$Si-MAS-NMR spectrum of the silicon compound particle, the peak intensity A or the peak intensity C is the highest intensity, and the peak intensity A and the peak intensity C satisfy a relationship of the following formula 1, formula 1: $C/3 \leq A \leq 3C$.

14 Claims, 3 Drawing Sheets

(51) Int. Cl.
    *H01M 4/587*         (2010.01)
    *H01M 4/48*           (2010.01)
    *H01M 4/38*           (2006.01)
    *H01M 4/58*           (2010.01)
    *H01M 4/02*           (2006.01)

(52) U.S. Cl.
    CPC ............... *H01M 4/38* (2013.01); *H01M 4/48* (2013.01); *H01M 4/58* (2013.01); *H01M 4/587* (2013.01); *H01M 4/5825* (2013.01); *C01P 2002/60* (2013.01); *C01P 2002/72* (2013.01); *C01P 2002/86* (2013.01); *C01P 2004/61* (2013.01); *C01P 2004/80* (2013.01); *C01P 2006/40* (2013.01); *H01M 2004/021* (2013.01); *H01M 2004/027* (2013.01)

(58) Field of Classification Search
    CPC ........ H01M 4/38; H01M 4/58; H01M 4/1391; H01M 4/587; H01M 4/5825; H01M 4/366; H01M 4/485; H01M 4/48; H01M 2004/027; C01B 33/32; C01B 33/182; C01P 2004/61; C01P 2002/60; C01P 2002/86; C01P 2002/72; C01P 2004/80; C01P 2006/40
    USPC .......................................... 429/231.4, 218.1
    See application file for complete search history.

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2011/0244333 | A1 | 10/2011 | Kawada |
| 2015/0303468 | A1 | 10/2015 | Kamo |
| 2016/0087267 | A1 | 3/2016 | Yoshio et al. |
| 2016/0233484 | A1 | 8/2016 | Hirose et al. |
| 2016/0329562 | A1* | 11/2016 | Akira ................ C09J 7/255 |
| 2016/0336592 | A1 | 11/2016 | Hirose et al. |

FOREIGN PATENT DOCUMENTS

| | | |
|---|---|---|
| CN | 105449183 A | 3/2016 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2011-222151 A | 11/2011 |
| JP | 2013-197012 A | 9/2013 |
| JP | 2014-103019 A | 6/2014 |
| JP | 2014-220216 A | 11/2014 |
| JP | 2015-153520 A | 8/2015 |
| JP | 2015-156355 A | 8/2015 |
| JP | 2015-165482 A | 9/2015 |
| JP | 2016-062860 A | 4/2016 |

OTHER PUBLICATIONS

Jun. 10, 2020 Taiwanese Office Action issued in Taiwanese Patent Application No. 106111825.
Nov. 8, 2019 Extended European Search Report issued in European Patent Application No. 17806185.9.
Lanson, Bruno et al. "Decomposition of Experimental X-Ray Diffraction Patterns (Profile Fitting): A Convenient Way to Study Clay Minerals" vol. 45, No. 2, pp. 132-146, 1997.
May 16, 2017 International Search Report issued in International Application No. PCT/JP2017/014626.
Sep. 8, 2020 Office Action issued in Japanese Patent Application No. 2018-520690.
Friede et al: "Letter to the Editor Some comments on So-called 'silicon monoxide'", Journal of Non-Crystalline Solids, Elsevier, vol. 204, Jan. 1, 1996 (Jan. 1, 1996), pp. 202-203.
Schulmeister K et al: "TEM investigation on the structure of amorphous silicon monoxide", Journal of Non-Crystalline Solids, Elsevier, vol. 320, No. 1-3, Jun. 1, 2003 (Jun. 1, 2003), pp. 143-150.
Yang J et al: "SiO"x-based anodes for secondary lithium batteries", Solid State Ionics, Elsevier, vol. 152-153, Dec. 1, 2002 (Dec. 1, 2002), pp. 125-129.
Aug. 6, 2020 Extended European Search Report issued in European Patent Application No. 17806185.9.
Nov. 25, 2020 Office Action issued in Taiwanese Patent Application No. 106111825.
Nov. 27, 2020 Office Action issued in Chinese Patent Application No. 201780031234.4.
Feb. 18, 2021 Office Action issued in Korean Patent Application No. 10-2018-7034271.

\* cited by examiner

[FIG. 1]
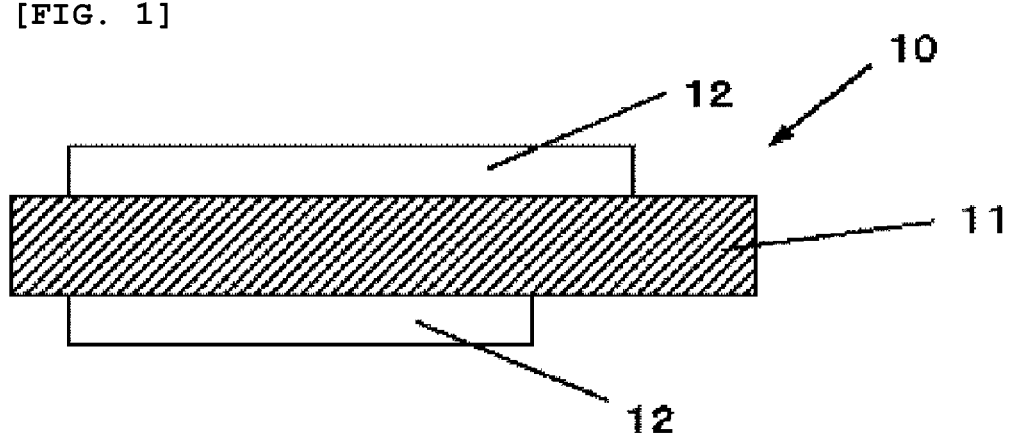
[FIG. 2]
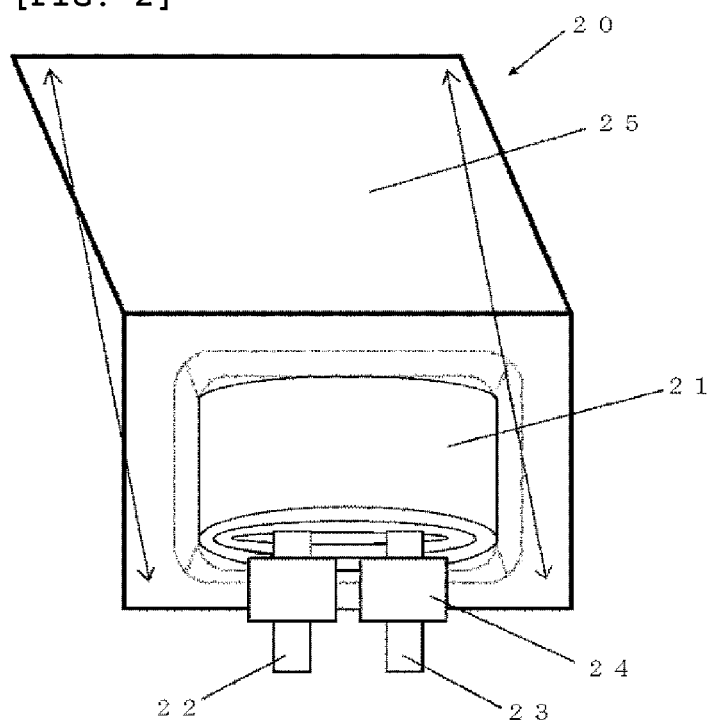
[FIG. 3]
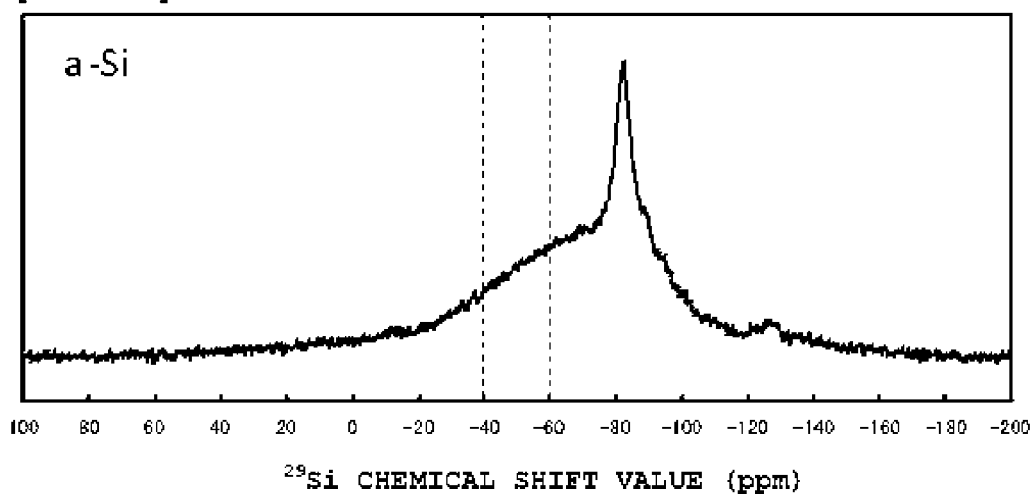

[FIG. 4]
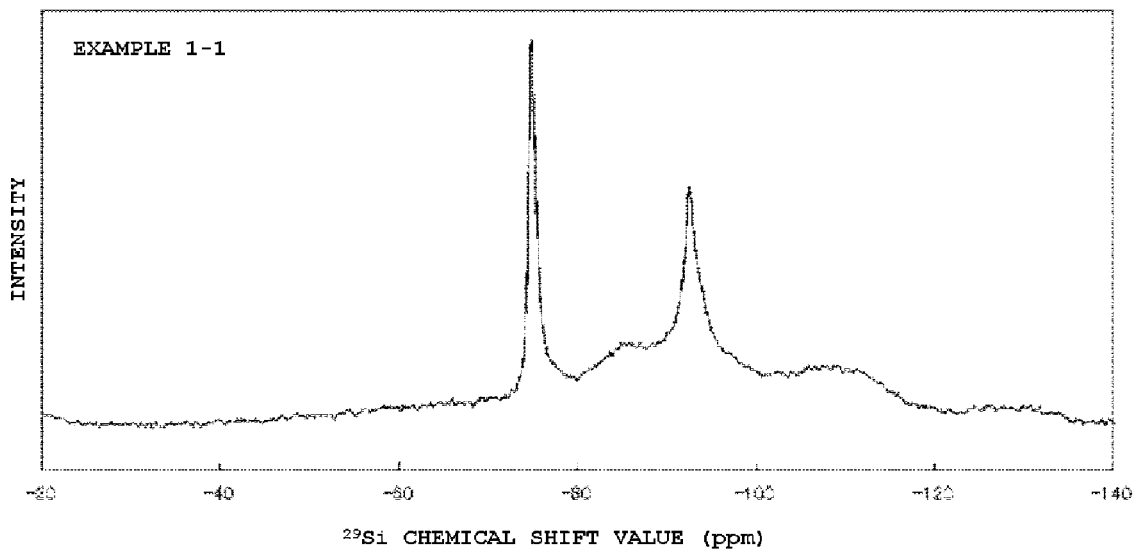
[FIG. 5]
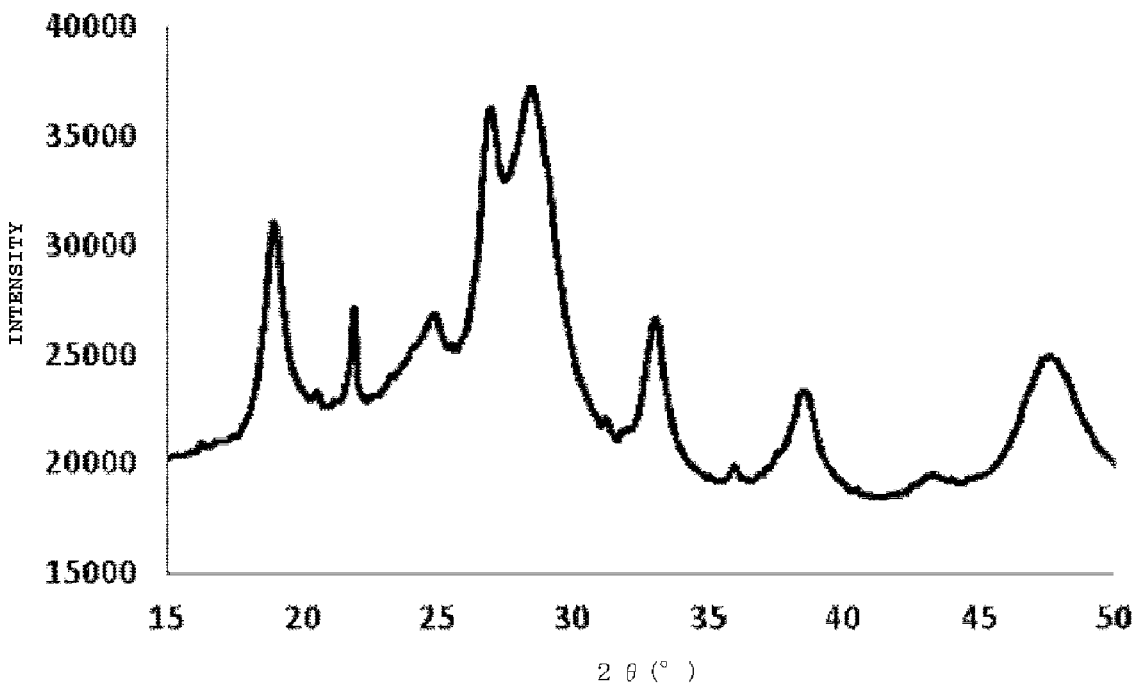

[FIG. 6]
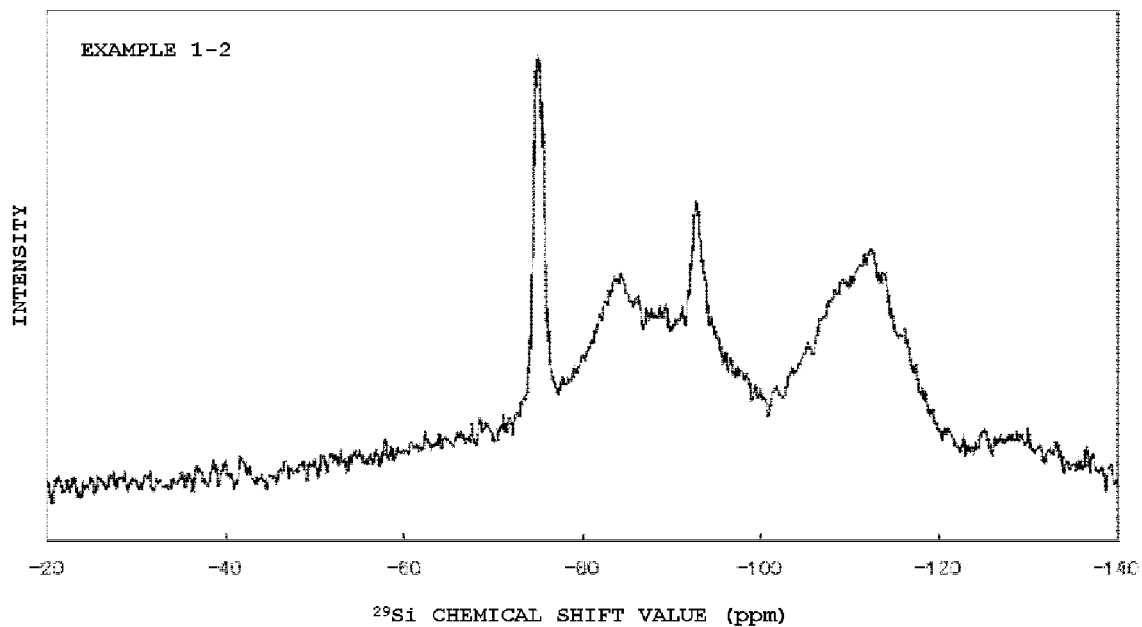
[FIG. 7]
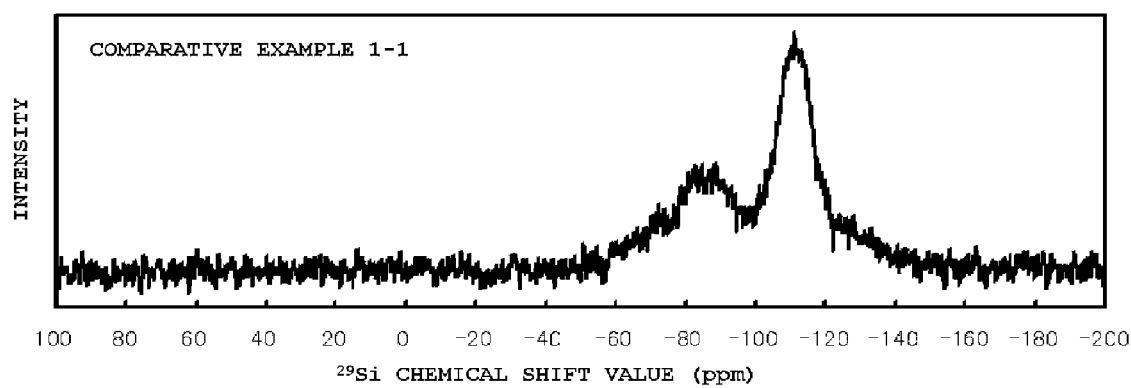
[FIG. 8]
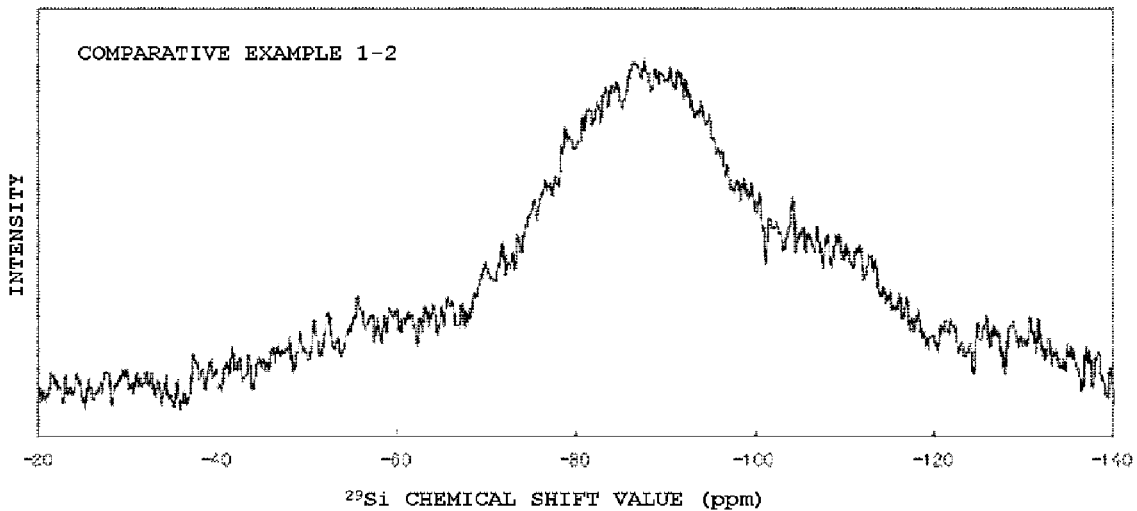

NEGATIVE ELECTRODE ACTIVE MATERIAL, MIXED NEGATIVE ELECTRODE ACTIVE MATERIAL, AND METHOD FOR PRODUCING NEGATIVE ELECTRODE ACTIVE MATERIAL

TECHNICAL FIELD

The present invention relates to a negative electrode active material, a mixed negative electrode active material, and a method for producing a negative electrode active material.

BACKGROUND ART

In recent years, small electronic devices represented by a mobile terminal and so forth is widely used, whereby further downsizing, weight reduction, and prolonged life are strongly requested. To meet such market needs, a secondary battery which can especially achieve downsizing, weight reduction, and high energy density is being developed. This secondary battery is being investigated for application not only to small electronic devices but also to large electronic devices represented by automobiles and the like as well as an electric power storage system represented by houses.

Among them, a lithium ion secondary battery has high expectation because downsizing and high capacity can be easily achieved and also a high energy density can be obtained as compared with a lead battery or a nickel cadmium battery.

The lithium ion secondary battery as mentioned above includes a positive electrode, a negative electrode, a separator, and an electrolytic solution. The negative electrode includes a negative electrode active material which involves in the charge and discharge reactions.

In the negative electrode active material, a carbon material is widely used, while a further increase in the battery capacity is requested from recent market needs. In order to increase the battery capacity, as the negative electrode active material, use of silicon is being studied. This is because the theoretical capacity of silicon (4199 mAh/g) is 10 times or more as much as the theoretical capacity of graphite (372 mAh/g), so that a significant increase in the battery capacity can be expected. Research and development of a silicon material as the material for the negative electrode active material are carried out with regard not only to silicon simple substance but also to compounds represented by an alloy and an oxide thereof. Besides, with regard to the form of the active material, the study has been made from a coating type which is standard in the carbon material to an integral type directly deposited onto a current collector.

However, when silicon is used as a main raw material in the negative electrode active material, the negative electrode active material undergoes expansion and contraction during charge and discharge, so that a crack can readily occur mainly near the surface of the negative electrode active material. In addition, inside the active material an ionic substance is formed and may cause a crack in the negative electrode active material. When the surface of the negative electrode active material is cracked, a new surface is formed so that the reactive area of the active material increases. In this event, a decomposition reaction of the electrolytic solution takes place on the new surface, and also the electrolytic solution is consumed because a film of the decomposition product of the electrolytic solution is formed on the new surface. Accordingly, the cycle characteristics easily deteriorate.

Until today, in order to improve the battery's initial efficiency and cycle characteristics, various investigations have been made with regard to the electrode configuration as well as the negative electrode material for the lithium ion secondary battery mainly composed of a silicon material.

Specifically, in order to obtain excellent cycle characteristics and high safety, silicon and amorphous silicon dioxide are simultaneously deposited by using a gas phase method (for example, see Patent Document 1). In order to obtain high battery capacity and high safety, a carbon material (electron conductive material) is disposed on the surface of silicon oxide particles (for example, see Patent Document 2). In order to improve the cycle characteristics and to obtain the high input/output characteristics, an active material containing silicon and oxygen is produced, and also an active material layer having a high oxygen ratio near a current collector is formed (for example, see Patent Document 3). In order to improve the cycle characteristics, a silicon active material is made to contain oxygen with an average oxygen content of 40 at % or less and also to have a higher oxygen content near a current collector (for example, see Patent Document 4).

Further, in order to improve the first time charge and discharge efficiency, a nano composite including an Si phase, $SiO_2$, and $M_yO$ metal oxide is used (for example, see Patent Document 5). In order to improve the cycle characteristics, a mixture of $SiO_x$ ($0.8 \leq x \leq 1.5$ and a particle diameter range of 1 to 50 μm) with a carbon material is burned at high temperature (for example, see Patent Document 6). In order to improve the cycle characteristics, a molar ratio of oxygen to silicon in a negative electrode active material is made 0.1 to 1.2, and the active material is controlled such that the difference between the maximum and minimum values of the molar ratio near the interface of the active material and the current collector is in the range of 0.4 or less (for example, see Patent Document 7). In order to improve the battery load characteristics, a metal oxide including lithium is used (for example, see Patent Document 8). In order to improve the cycle characteristics, a hydrophobic layer of a silane compound or the like is formed on the silicon material surface layer (for example, see Patent Document 9). In order to improve the cycle characteristics, silicon oxide is used, and on the surface layer thereof, a graphite coating film is formed so as to provide conductivity (for example, see Patent Document 10). In Patent Document 10, with regard to the shift values obtained from the Raman spectrum of the graphite film, broad peaks appear at 1330 $cm^{-1}$ and 1580 $cm^{-1}$ with the intensity ratio $I_{1330}/I_{1580}$ being $1.5 < I_{1330}/I_{1580} < 3$. In order to obtain a high battery capacity and to improve the cycle characteristics, particles having a silicon microcrystal phase dispersed in silicon dioxide are used (for example, see Patent Document 11). In order to improve the over-charge and over-discharge characteristics, a silicon oxide is used in which the atom number ratio of silicon to oxygen is controlled at 1:y ($0 < y < 2$) (for example, see Patent Document 12).

CITATION LIST

Patent Literature

Patent Literature 1: JP 2001-185127
Patent Literature 2: JP 2002-042806 A
Patent Literature 3: JP 2006-164954 A
Patent Literature 4: JP 2006-114454 A
Patent Literature 5: JP 2009-070825 A
Patent Literature 6: JP 2008-282819 A Patent Literature 7: JP 2008-251369 A
Patent Literature 8: JP 2008-177346 A
Patent Literature 9: JP 2007-234255 A
Patent Literature 10: JP 2009-212074 A
Patent Literature 11: JP 2009-205950 A
Patent Literature 12: JP 2997741 B1

SUMMARY OF INVENTION

Technical Problem

As mentioned above, in recent years, in small electronic devices represented by a mobile terminal and so forth, enhancement of performance and multi-functionalization are being progressing, thereby requiring an increase in the battery capacity of a lithium ion secondary battery, which is a main power source thereof. As one method to solve this problem, the lithium ion secondary battery provided with a negative electrode using a silicon-based active material as a main material thereof is desired to be developed. In addition, the lithium ion secondary battery using the silicon-based active material is requested to be almost equivalent to the lithium ion secondary battery using a carbon-based active material in terms of a first time efficiency, cycle characteristics, and a stability of an aqueous slurry prepared when the negative electrode is prepared. However, a negative electrode active material showing the first time efficiency, cycle stability, and slurry stability that are equivalent to those of the lithium ion secondary battery using the carbon-based active material has not been proposed yet.

The present invention was made in view of the problems mentioned above, and it is an object of the present invention to provide: a negative electrode active material that can stabilize a slurry prepared when a negative electrode of a secondary battery is prepared and that can improve the cycle characteristics as well as the initial charge and discharge characteristics when this negative electrode active material is used as a negative electrode active material for the secondary battery; and a mixed negative electrode active material including the negative electrode active material. Also, it is an object of the present invention to provide a method for producing the negative electrode active material that can stabilize a slurry prepared when the negative electrode is prepared and that can improve the initial charge and discharge characteristics and cycle characteristics.

In addition, another object of the present invention is to provide a method for producing a negative electrode active material excellent in battery characteristics and slurry stability as described above.

Solution to Problem

In order to achieve the objects mentioned above, the present invention provides a negative electrode active material comprising a negative electrode active material particle, wherein
the negative electrode active material particle comprises a silicon compound particle comprising a silicon compound ($SiO_x$: $0.5 \leq x \leq 1.6$),
the silicon compound particle comprises crystalline $Li_2SiO_3$ and $Li_2Si_2O_5$ in at least part of the silicon compound particle,
among a peak intensity A derived from $Li_2SiO_3$, a peak intensity B derived from Si, a peak intensity C derived from $Li_2Si_2O_5$, and a peak intensity D derived from $SiO_2$ which are obtained from a $^{29}$Si-MAS-NMR ($^{29}$Si-Magic Angle Spinning-Nuclear Magnetic Resonance) spectrum of the silicon compound particle, the peak intensity A or the peak intensity C is the highest intensity, and
the peak intensity A and the peak intensity C satisfy a relationship of the following formula 1, $$C/3 \leq A \leq 3C. \qquad \text{formula 1:}$$

Because the negative electrode active material of the present invention includes the negative electrode active material particle including the silicon compound particle (also referred to as silicon-based active material particle), the battery capacity can be improved. In addition, because the silicon compound particle includes lithium silicates as described above, an irreversible capacity generated during charging can be reduced. Thus, the first time efficiency of the battery can be improved. Moreover, in a case where the peak intensity A derived from $Li_2SiO_3$ thus obtained is the highest, the water resistance is improved more than cases where the content of other Li silicates such as $Li_4SiO_4$ is high. Further, since $Li_2SiO_3$ is formed with low thermal energy, the crystallinity of the Si component is suppressed to be comparatively low in the silicon compound particle, thereby improving the cycle characteristics. Meanwhile, in a case where the peak intensity C derived from $Li_2Si_2O_5$ thus obtained is the highest, the water resistance is especially improved because $Li_2Si_2O_5$ is much less soluble in water than $Li_2SiO_3$ is. Furthermore, with such a peak intensity ratio as described above in the formula 1, the Li silicates are balanced such that both the improvement in the cycle characteristics of the battery and the slurry stability can be achieved.

At this time, a sum of the peak intensity A and the peak intensity C preferably takes a value four times or more as large as a sum of the peak intensity B and the peak intensity D in the $^{29}$Si-MAS-NMR spectrum.

In such a case, the silicon compound particle has a higher content of Li silicates such as $Li_2SiO_3$ and $Li_2Si_2O_5$ having comparatively high water resistance, so that the water resistance of the negative electrode active material is further improved.

In addition, the peak intensity B is preferably higher than the peak intensity D in the $^{29}$Si-MAS-NMR spectrum.

Such a negative electrode active material can further improve the initial efficiency of the battery.

In addition, a peak preferably appears in a region near a chemical shift value of −130 ppm in the $^{29}$Si-MAS-NMR spectrum.

The peak appearing near the chemical shift value of −130 ppm is presumably derived from amorphous silicon. Hence, the ratio of the amorphous silicon component is higher, making it possible to further improve the cycle characteristics.

In addition, in the silicon compound particle, preferably, a half-value width (2θ) of a diffraction peak attributable to a Si (111) crystal plane obtained by an X-ray diffraction using Cu-Kα ray is 1.2° or more, and a crystallite's size corresponding to the crystal plane is 7.5 nm or less.

When the negative electrode active material including the silicon compound particle having the above silicon crystallinity is used as a negative electrode active material for a lithium ion secondary battery, more excellent cycle characteristics and initial charge and discharge characteristics are obtained.

In addition, preferably, a test cell is prepared, the test cell comprising a counter lithium and a negative electrode, which comprises a mixture of the negative electrode active material and a carbon-based active material;

in the test cell, charge in which a current is flowed so as to insert lithium into the negative electrode active material and discharge in which a current is flowed so as to release lithium from the negative electrode active material are executed for 30 times; and when a graph is drawn showing a relationship between an electric potential V of the negative electrode and a differential value dQ/dV, which is obtained by differentiating a discharge capacity Q in each charge and discharge with the electric potential V with a standard of the counter lithium, the differential value dQ/dV upon discharging on and after Xth time ($1 \leq X \leq 30$) has a peak in a range of 0.40 V to 0.55 V of the electric potential V of the negative electrode.

The peak in the V-dQ/dV curve mentioned above resembles the peak of a silicon material. Because the discharge curve in a higher electric potential side rises sharply, a capacity can be readily expressed upon battery design. In addition, when the peak appears within 30 times of the charge and discharge, a stable bulk is formed in the negative electrode active material.

In addition, the negative electrode active material particles preferably have a median diameter of 1.0 μm or more and 15 μm or less.

When the median diameter is 1.0 μm or more, increase in the irreversible capacity of the battery due to the increase in the surface area per mass can be suppressed. On the other hand, when the median diameter is 15 μm or less, the particles are difficult to be cracked, so that a new surface is difficult to be emerged.

In addition, the negative electrode active material particle preferably contains a carbon material at a surface layer portion.

In this manner, when the negative electrode active material particle contains a carbon material at the surface layer portion, the conductivity can be improved.

In addition, the carbon material preferably has an average thickness of 5 nm or more and 5000 nm or less.

When the carbon material has an average thickness of 5 nm or more, the conductivity can be improved. Meanwhile, when the carbon material to be coated has an average thickness of 5000 nm or less, the use of the negative electrode active material including the negative electrode active material particle like this in a lithium ion secondary battery can ensure sufficient amount of the silicon compound particle, so that the decrease in the battery capacity can be suppressed.

Moreover, the present invention provides a mixed negative electrode active material comprising:
the negative electrode active material; and
a carbon-based active material.

In this manner, when the material for forming a negative electrode active material layer is made so as to include a carbon-based active material as well as the negative electrode active material of the present invention (silicon-based negative electrode active material), the conductivity of the negative electrode active material layer can be improved, and also an expansion stress due to charging can be relaxed. In addition, mixing the silicon-based negative electrode active material with the carbon-based active material can increase the battery capacity.

At this time, a ratio of the negative electrode active material relative to a total amount of the mixed negative electrode active material is preferably 10% by mass or more.

When the ratio of the mass of the negative electrode active material (silicon-based negative electrode active material) relative to a total mass of the negative electrode active material (silicon-based negative electrode active material) and the carbon-based active material is 10% by mass or more, the battery capacity can be further improved.

Further, to achieve the above object, the present invention provides A method for producing a negative electrode active material which comprises a negative electrode active material particle comprising a silicon compound particle, the method comprising the steps of:

making silicon compound particles comprising a silicon compound ($SiO_x$: $0.5 \leq x \leq 1.6$);

inserting lithium into the silicon compound particles so as to include crystalline $Li_2SiO_3$ and $Li_2Si_2O_5$ in at least part of the silicon compound particles to prepare negative electrode active material particles;

selecting, from the negative electrode active material particles, such a negative electrode active material particle that, among a peak intensity A derived from $Li_2SiO_3$, a peak intensity B derived from Si, a peak intensity C derived from $Li_2Si_2O_5$, and a peak intensity D derived from $SiO_2$ which are obtained from a $^{29}Si$-MAS-NMR spectrum of the negative electrode active material particle, the peak intensity A or the peak intensity C is the highest intensity, and the peak intensity A and the peak intensity C satisfy a relationship of the following formula 1; and producing a negative electrode active material by using the selected negative electrode active material particle, $$C/3 \leq A \leq 3C. \qquad \text{formula 1:}$$

When the negative electrode active material is produced by selecting the negative electrode active material particle as described above, an aqueous slurry prepared in preparing the negative electrode can be stabilized; in addition, the produced negative electrode active material can have a high capacity and also excellent cycle characteristics and initial charge and discharge characteristics when used as a negative electrode active material for a lithium ion secondary battery.

Advantageous Effects of Invention

The negative electrode active material of the present invention is capable of stabilizing an aqueous slurry prepared when the negative electrode is prepared. In addition, when the negative electrode active material of the present invention is used as a negative electrode active material for a secondary battery, a high capacity and excellent cycle characteristics and excellent initial charge and discharge characteristics are obtained. Moreover, the same effects are also obtained from the mixed negative electrode active material including this negative electrode active material. Further, the method for producing a negative electrode active material of the present invention makes it possible to produce a negative electrode active material which can stabilize an aqueous slurry prepared in preparing the negative electrode, and which has excellent cycle characteristics and excellent initial charge and discharge characteristics when used as a negative electrode active material for a lithium ion secondary battery.

BRIEF DESCRIPTION OF DRAWINGS

FIG. 1 is a cross-sectional view showing an example of a constitution of a negative electrode for a non-aqueous electrolyte secondary battery, the negative electrode containing the negative electrode active material of the present invention.

FIG. 2 is a figure illustrating a constitution example (laminate film type) of a lithium secondary battery containing the negative electrode active material of the present invention.

FIG. 3 is an example of a spectrum obtained when a silicon compound particle including amorphous silicon is measured by using $^{29}$Si-MAS-NMR.

FIG. 4 is a $^{29}$Si-MAS-NMR spectrum measured in Example 1-1.

FIG. 5 is an X-ray diffraction spectrum measured in Example 1-1.

FIG. 6 is a $^{29}$Si-MAS-NMR spectrum measured in Example 1-2.

FIG. 7 is a $^{29}$Si-MAS-NMR spectrum measured in Comparative Example 1-1.

FIG. 8 is a $^{29}$Si-MAS-NMR spectrum measured in Comparative Example 1-2.

DESCRIPTION OF EMBODIMENTS

Hereinafter, embodiments of the present invention will be explained; however, the present invention is not limited thereto.

As mentioned above, as one method to increase the battery capacity of a lithium ion secondary battery, the use of a negative electrode using a silicon material as a main material has been studied as a negative electrode for the lithium ion secondary battery. It is desired that the lithium ion secondary battery using this silicon material have the slurry stability, initial charge and discharge characteristics, and cycle characteristics that are almost equivalent to those of the lithium ion secondary battery using a carbon-based active material. However, no negative electrode active material having the slurry stability, initial charge and discharge characteristics, and cycle characteristics that are equivalent to those of the lithium ion secondary battery using a carbon-based active material has been proposed yet.

Therefore, the present inventors have conducted earnest studies to obtain a negative electrode active material having a high battery capacity and also excellent slurry stability, cycle characteristics, and first time efficiency when used for a secondary battery, thereby bringing the present invention to the completion.

The negative electrode active material of the present invention includes a negative electrode active material particle. This negative electrode active material particle includes a silicon compound particle including a silicon compound ($SiO_x$: $0.5 \leq x \leq 1.6$). The silicon compound particle includes crystalline $Li_2SiO_3$ and crystalline $Li_2Si_2O_5$ in at least part of the silicon compound particle. In addition, among a peak intensity A derived from $Li_2SiO_3$, a peak intensity B derived from Si, a peak intensity C derived from $Li_2Si_2O_5$, and a peak intensity D derived from $SiO_2$ which are obtained from a $^{29}$Si-MAS-NMR spectrum of the silicon compound particle, the peak intensity A or the peak intensity C is the highest intensity, and the peak intensity A and the peak intensity C satisfy a relationship of the following formula 1, $$C/3 \leq A \leq 3C. \qquad \text{formula 1:}$$

Since such a negative electrode active material includes the negative electrode active material particle including the silicon compound particle, the battery capacity can be improved. In addition, incorporating lithium silicates as described above into the silicon compound particle can reduce an irreversible capacity generated during charging. Moreover, in the case where the peak intensity A derived from $Li_2SiO_3$ thus obtained is the highest, the water resistance is improved more than the cases where the content of other Li silicates such as $Li_4SiO_4$ is high. The high water resistance of the negative electrode active material improves the stability of an aqueous slurry for preparing a negative electrode (in the slurry, the negative electrode active material and so forth are dispersed in an aqueous solvent), and makes the negative electrode active material tolerable for use in industrial production processes of batteries. Further, since $Li_2SiO_3$ is formed with low thermal energy, the Si crystallinity in the silicon compound is suppressed to be comparatively low, so that the cycle characteristics are improved. Meanwhile, in the case where the peak intensity C derived from $Li_2Si_2O_5$ thus obtained is the highest, since $Li_2Si_2O_5$ is much less soluble in water than $Li_2SiO_3$, the water resistance is especially improved. Furthermore, with the peak intensity ratio according to the formula 1 as described above, the negative electrode active material has such balanced Li silicates that both the improvement in the cycle characteristics of the battery and the slurry stability can be achieved.

In the $^{29}$Si-MAS-NMR spectrum, the peak derived from $Li_2SiO_3$ appears near a chemical shift value of −75 ppm, the peak derived from Si appears near a chemical shift value of −86 ppm, the peak derived from $Li_2Si_2O_5$ appears near a chemical shift value of −93 ppm, and the peak derived from $SiO_2$ appears near a chemical shift value of −110 ppm.

The $^{29}$Si-MAS-NMR spectrum measurement conditions may be ordinary measurement conditions. For example, the following conditions can be set:
Si MAS NMR
Instrument: 700 NMR spectrophotometer manufactured by Bruker Corp.,
Probe: 4 mm HR-MAS rotor, 50 μL,
Sample rotation speed: 10 kHz,
Measured environment temperature: 25° C.

A peak intensity is represented by the height of the peak from a base line calculated based on the $^{29}$Si-MAS-NMR spectrum. In this event, the base line can be determined by an ordinary method.

Moreover, in the negative electrode active material of the present invention, a sum of the peak intensity A and the peak intensity C preferably takes a value four times or more as large as a sum of the peak intensity B and the peak intensity D in the $^{29}$Si-MAS-NMR spectrum of the silicon compound particle. In such a case, the silicon compound particle has a higher content of Li silicates such as $Li_2SiO_3$ and $Li_2Si_2O_5$ having comparatively high water resistance. This improves the water resistance of the negative electrode active material.

Further, in the $^{29}$Si-MAS-NMR spectrum, the peak intensity B is preferably higher than the peak intensity D. When the relationship of B>D is satisfied, the content of $SiO_2$, which can cause the irreversible capacity during charging, is low in comparison with Si in the silicon compound particle, so that the initial efficiency of the battery can be further improved.

Furthermore, in the $^{29}$Si-MAS-NMR spectrum, a peak preferably appears in a region near a chemical shift value of −130 ppm. In such a case, the ratio of the amorphous silicon component in the silicon compound is higher, so that the cycle characteristics can be further improved. Note that FIG. 3 shows an example of a peak derived from amorphous silicon. As in FIG. 3, the peak derived from amorphous silicon appears at a position near a chemical shift value of −130 ppm in the $^{29}$Si-MAS-NMR spectrum.

<Negative Electrode>

First, a negative electrode containing the negative electrode active material of the present invention will be explained. FIG. 1 is a cross-sectional view showing an example of a constitution of a negative electrode containing the negative electrode active material of the present invention.

[Constitution of Negative Electrode]

As illustrated in FIG. 1, a negative electrode 10 is configured to have a negative electrode active material layer 12 on a negative electrode current collector 11. This negative electrode active material layer 12 may be provided on both surfaces of the negative electrode current collector 11 or only on one surface thereof. Further, the negative electrode current collector 11 may not be used when the negative electrode active material of the present invention is used.

[Negative Electrode Current Collector]

The negative electrode current collector 11 is formed of an excellent conductive material which is also a mechanically strong material. Illustrative example of the conductive material usable in the negative electrode current collector 11 includes copper (Cu) and nickel (Ni). It is preferable that the conductive material do not form an intermetallic compound with lithium (Li).

It is preferable that the negative electrode current collector 11 include carbon (C) and sulfur (S), in addition to main elements. This is because a physical strength of the negative electrode current collector can be increased by so doing, and because especially in the case that the negative electrode has an active material layer which expands upon charging, if the current collector includes the elements mentioned above, deformation of the electrode including the current collector can be suppressed. Contents of these elements are not particularly restricted; but especially, it is preferable that content of each element be 70 ppm by mass or less. This is because a higher effect to suppress the deformation can be obtained. Such an effect to suppress deformation can further improve the cycle characteristics.

Surface of the negative electrode current collector 11 may be roughened or not be roughened. Illustrative example of the roughened negative electrode current collector includes a metal foil having been subjected to an electrolytic treatment, an emboss treatment, or a chemical etching treatment; and the like. Illustrative example of the negative electrode current collector that is not roughened includes a rolled metal foil, and the like.

[Negative Electrode Active Material Layer]

The negative electrode active material layer 12 includes the negative electrode active material of the present invention which can store and release a lithium ion; and in addition, in view of a battery design, it may include other materials such as a negative electrode binder and a conductive assistant. The negative electrode active material includes the negative electrode active material particle, and the negative electrode active material particle includes the silicon compound particle including the silicon compound ($SiO_x$: $0.5 \leq x \leq 1.6$).

In addition, the negative electrode active material layer 12 may include a mixed negative electrode active material including the negative electrode active material of the present invention (silicon-based negative electrode active material) and a carbon-based active material. With these, electric resistance of the negative electrode active material layer can be lowered and also an expansion stress due to charging can be relaxed. Illustrative example of the carbon-based active material usable includes thermally decomposed carbons, cokes, glass-like carbon fibers, fired bodies of organic polymer compounds, carbon blacks, and the like.

In the mixed negative electrode active material, it is preferable that the ratio of the mass of the silicon-based negative electrode active material relative to the total mass of the silicon-based negative electrode active material and the carbon-based active material be 10% by mass or more. When the ratio of the silicon-based negative electrode active material is 10% by mass or more, the battery capacity can be further improved.

The negative electrode active material of the present invention is a silicon oxide material which includes the silicon compound particle, and the silicon compound particle includes the silicon compound ($SiO_x$: $0.5 \leq x \leq 1.6$) as mentioned before; in the composition thereof, it is more preferable when x approach near to 1. This is because an excellent cycle characteristics can be obtained by so doing. Meanwhile, the composition of the silicon compound in the present invention does not necessarily mean a purity of 100%, so that it may contain minute amounts of impurity elements.

In the negative electrode active material of the present invention, the silicon compound particle includes crystalline $Li_2SiO_3$ and crystalline $Li_2Si_2O_5$ as described above. These are materials obtained by reforming a $SiO_2$ component portion to different lithium silicates in advance in the silicon compound; the $SiO_2$ component portion would be destabilized upon insertion and release of lithium during charging and discharging of the battery. This reformation enables a reduction in the irreversible capacity generated upon charging.

In addition to the Li silicates, $Li_4SiO_4$ may be present in the bulk of the silicon compound particle. Thereby, the battery characteristics are further improved. Meanwhile, these lithium silicates can be quantified by NMR as described above. Besides, quantification by XPS (X-ray photoelectron spectroscopy) is possible. NMR measurement can be made by the conditions as described above. XPS measurement can be made, for example, by the following conditions.

XPS
Instrument: X-ray photoelectron spectroscopy instrument,
X-ray source: mono-colored Al Kα beam,
X-ray spot diameter: 100 μm,
Ar ion gun sputtering condition: 0.5 kV/2 mm×2 mm.

In addition, in the silicon compound particle, preferably, a half-value width (2θ) of a diffraction peak attributable to a Si (111) crystal plane obtained by an X-ray diffraction using Cu-Kα ray is 1.2° or more, and a crystallite's size corresponding to the crystal plane is 7.5 nm or less. This peak appears near 2θ=28.4±0.5° when the crystallinity is high (when the half-value width is narrow). Silicon crystallinity of the silicon compound in the silicon compound particle is better as the crystallinity thereof is lower; and thus, especially when amount of the Si crystal is small, the battery characteristics can be improved and also a stable Li compound can be produced.

Moreover, in the negative electrode active material of the present invention, the negative electrode active material particle preferably contains a carbon material at a surface layer portion. When the negative electrode active material particle contains a carbon material at the surface layer portion of the negative electrode active material particle, the conductivity can be improved. Accordingly, when the negative electrode active material including such a negative electrode active material particle is used as a negative electrode active material for a secondary battery, the battery characteristics can be improved.

Further, the carbon material at the surface layer portion of the negative electrode active material particle preferably has an average thickness of 5 nm or more and 5000 nm or less. When the carbon material has an average thickness of 5 nm or more, the conductivity can be improved. When the carbon material to be coated has an average thickness of 5000 nm or less, the decrease in the battery capacity can be suppressed by using the negative electrode active material including such a negative electrode active material particle as a negative electrode active material for a lithium ion secondary battery.

The average thickness of this carbon material can be calculated, for example, by the procedure shown below. First, the negative electrode active material particle is observed under TEM (transmission electron microscope) with an arbitrary magnification. With regard to the magnification, it is preferable that with this magnification the thickness of the carbon material can be visually confirmed so as to measure the thickness. Next, the thickness of the carbon material is measured in arbitrary 15 spots. At this time, it is preferable to set the measurement spots widely and randomly, not to concentrate to a certain spot as much as possible. Finally, the average value of the thicknesses of the 15 spots in the carbon material is calculated.

The covering rate of the carbon material is not particularly restricted; however, the rate as high as possible is preferable. The covering rate of 30% or more is preferable because the electric conductivity can be improved furthermore. The covering method of the carbon material is not particularly restricted; however, a sugar carbonization method and a thermal decomposition method of a hydrocarbon gas are preferable. This is because these methods can improve the covering rate.

In addition, the negative electrode active material particles preferably have a median diameter ($D_{50}$: particle diameter when the cumulative volume reaches 50%) of 1.0 μm or more and 15 μm or less. This is because when the median diameter is within the above-mentioned range, storing and release of the lithium ion upon charging and discharging is facilitated, and also the particles are difficult to be cracked. When the median diameter is 1.0 μm or more, the surface area per a unit mass can be made small, so that increase in the irreversible capacity of the battery can be suppressed. On the other hand, when the median diameter is 15 μm or less, the particles are difficult to be cracked, so that a new surface is difficult to be emerged.

The negative electrode active material (silicon-based active material) of the present invention is preferably such that a test cell is prepared which includes a counter lithium and a negative electrode including a mixture of the silicon-based active material and a carbon-based active material; in the test cell, charge in which a current is flowed so as to insert lithium into the silicon-based active material and discharge in which a current is flowed so as to release lithium from the silicon-based active material are executed for 30 times; and when a graph is drawn showing a relationship between an electric potential V of the negative electrode and a differential value dQ/dV, which is obtained by differentiating a discharge capacity Q in each charge and discharge with the electric potential V with a standard of the counter lithium, the differential value dQ/dV upon discharging on and after Xth time ($1 \leq X \leq 30$) has a peak in a range of 0.40 V to 0.55 V of the electric potential V of the negative electrode. The peak in the V–dQ/dV curve mentioned above resembles the peak of a silicon material. Because the discharge curve in a higher electric potential side rises sharply, a capacity can be readily expressed upon battery design. In addition, when the peak appears within 30 times of the charge and discharge, it can be determined that a stable bulk is formed in the negative electrode active material.

As to the negative electrode binder included in the negative electrode active material layer, for example, any one or more of a polymer material, a synthetic rubber, etc. can be used. Illustrative example of the polymer material includes polyvinylidene fluoride, polyimide, polyamide imide, aramid, polyacrylic acid, lithium polyacrylate, carboxymethyl cellulose, and the like. Illustrative example of the synthetic rubber includes a styrene butadiene-based rubber, a fluorinated rubber, ethylene propylene diene, and the like.

As to the negative electrode conductive assistant, for example, any one or more of carbon materials such as a carbon black, an acetylene black, a graphite, a Ketjen black, a carbon nanotube, and a carbon nanofiber can be used.

The negative electrode active material layer is formed, for example, by a coating method. The coating method is the method in which the negative electrode active material particle, the binder, etc. as well as, if necessary, the conductive assistant and the carbon material are mixed, the resulting mixture is dispersed in an organic solvent, water or the like, and then the resultant is applied.

[Method for Producing Negative Electrode]

The negative electrode can be produced, for example, by the procedure shown below. At first, the method for producing the negative electrode active material to be used for the negative electrode will be explained. First, the silicon compound particles including the silicon compound ($SiO_x$: $0.5 \leq x \leq 1.6$) are made. Next, Li is inserted into the silicon compound particles so as to include crystalline $Li_2SiO_3$ and $Li_2Si_2O_5$ in at least part of the silicon compound particles. In this manner, negative electrode active material particles are prepared. Then, from the prepared negative electrode active material particles, such a negative electrode active material particle is selected that, among a peak intensity A derived from $Li_2SiO_3$, a peak intensity B derived from Si, a peak intensity C derived from $Li_2Si_2O_5$, and a peak intensity D derived from $SiO_2$ which are obtained from a $^{29}Si$-MAS-NMR spectrum of the negative electrode active material particle, the peak intensity A or the peak intensity C is the highest intensity, and the peak intensity A and the peak intensity C satisfy a relationship of the above-described formula 1. Subsequently, the selected negative electrode active material particle is used to produce a negative electrode active material.

Moreover, the preparation of the negative electrode active material particles may further include a step of covering the silicon compound particles with a carbon material. The covering step with a carbon material can be performed before the step of inserting Li. The negative electrode active material particles prepared by covering the surfaces of the silicon compound particles with the carbon material are excellent in the conductivity.

More specifically, the negative electrode active material can be produced as follows. First, a raw material capable of generating a silicon oxide gas is heated under reduced pressure in the presence of an inert gas in the temperature range of 900 to 1600° C., so that the silicon oxide gas is generated. Considering the presence of oxygen on the metal silicon powder surface and minute amount of oxygen in a reaction furnace, the mixing molar ratio preferably satisfies the relationship of 0.8<metal silicon powder/silicon dioxide powder<1.3.

The generated silicon oxide gas is solidified on an adsorbing plate and deposited thereon. Next, the deposited silicon oxide is taken out under the state that the temperature inside the reaction furnace is dropped to 100° C. or lower; and then, the deposited silicon oxide is crushed and pulverized by using a ball mill, a jet mill, or the like. In this way, the silicon compound particle can be prepared. Meanwhile, the Si crystallite in the silicon compound particle can be controlled by changing the vaporization temperature or a heat treatment after the formation thereof.

Here, a layer of the carbon material may be formed on the surface layer of the silicon compound particle. As to the formation method of the carbon material layer, a thermal decomposition CVD method is preferable. A method for forming the carbon material layer by the thermal decomposition CVD method will be explained.

First, the silicon compound particle is set in a furnace. Next, a hydrocarbon gas is introduced into the furnace, and then, the temperature inside the furnace is raised. The decomposition temperature is not particularly restricted; however, 1200° C. or lower is preferable, more preferably 950° C. or lower. When the decomposition temperature is 1200° C. or lower, it is possible to suppress unintended disproportionation of the silicon compound particle. After the temperature inside the furnace is raised to a predetermined temperature, the carbon layer is formed on the silicon compound particle surface. In this manner, the negative electrode active material particle can be produced. The hydrocarbon gas used as the raw material of the carbon material is not particularly restricted; however, in the $C_nH_m$ composition, $n \leq 3$ is preferable. When $n \leq 3$, the production cost thereof can be made low, and also physical properties of the decomposition products can be made excellent.

Next, reformation is carried out by inserting Li into the negative electrode active material particle prepared as described above. In this event, $Li_2SiO_3$ and $Li_2Si_2O_5$ are incorporated into the negative electrode active material particle. Li can be inserted, for example, by a thermal doping method, an electrochemical method, or an oxidation-reduction method, preferably an oxidation-reduction method.

In the reformation by the oxidation-reduction method, for example, first, lithium can be inserted by immersing the silicon active material particle into a solution A in which lithium has been dissolved in an ether solvent. This solution A may further contain a polycyclic aromatic compound or a linear polyphenylene compound. After the lithium insertion, the silicon active material particle is immersed into a solution B containing a polycyclic aromatic compound or a derivative thereof, so that active lithium can be released from the silicon active material particle. As a solvent of the solution B, for example, an ether-based solvent, a ketone-based solvent, an ester-based solvent, an alcohol-based solvent, an amine-based solvent, or a mixed solvent thereof can be used. Alternatively, after the immersion into the solution A, the resulting silicon active material particle may be heated in an inert gas. This heat treatment can stabilize the Li compound. Then, the resultant may be washed, for example, by a washing method with an alcohol, alkaline water in which lithium carbonate has been dissolved, a weak acid, pure water, or the like.

As the ether-based solvent used in the solution A, it is possible to use diethyl ether, tert-butylmethyl ether, tetrahydrofuran, dioxane, 1,2-dimethoxy ethane, diethylene glycol dimethyl ether, triethylene glycol dimethyl ether, tetraethylene glycol dimethyl ether, a mixed solvent thereof, or the like. Among them, tetrahydrofuran, dioxane, or 1,2-dimethoxy ethane is particularly preferably used. These solvents are preferably dehydrated, and preferably deoxidized.

As the polycyclic aromatic compound contained in the solution A, it is possible to use one or more of naphthalene, anthracene, phenanthrene, naphthacene, pentacene, pyrene, picene, triphenylene, coronene, chrysene, and derivatives thereof. As the linear polyphenylene compound, it is possible to use one or more of biphenyl, terphenyl, and derivatives thereof.

As the polycyclic aromatic compound contained in the solution B, it is possible to use one or more of naphthalene, anthracene, phenanthrene, naphthacene, pentacene, pyrene, picene, triphenylene, coronene, chrysene, and derivatives thereof.

As the ether-based solvent of the solution B, it is possible to use diethyl ether, tert-butylmethyl ether, tetrahydrofuran, dioxane, 1,2-dimethoxy ethane, diethylene glycol dimethyl ether, triethylene glycol dimethyl ether, tetraethylene glycol dimethyl ether, and the like.

As the ketone-based solvent, it is possible to use acetone, acetophenone, and the like.

As the ester-based solvent, it is possible to use methyl formate, methyl acetate, ethyl acetate, propyl acetate, isopropyl acetate, and the like.

As the alcohol-based solvent, it is possible to use methanol, ethanol, propanol, isopropyl alcohol, and the like.

As the amine-based solvent, it is possible to use methylamine, ethylamine, ethylenediamine, and the like.

Next, the reformed negative electrode active material particle may be washed.

Then, the washed negative electrode active material particle may be heated. More specifically, the heat treatment can be performed under an Ar atmosphere at a heat treatment temperature in a range from 500° C. to 750° C. Heating the reformed negative electrode active material particle can convert $Li_4SiO_4$ to $Li_2SiO_3$ and $Li_2Si_2O_5$. In the reformation by the electrochemical method and the oxidation-reduction method, $Li_4SiO_4$ is likely to be formed as the Li silicate. Nevertheless, adjustment is also possible by this heat treatment in such a way as to convert $Li_4SiO_4$ to $Li_2SiO_3$ and $Li_2Si_2O_5$, so that the peak intensity A or the peak intensity C becomes the highest while the peak intensity A and the peak intensity C satisfy the relationship of the formula 1. In this case, the heat treatment temperature is more preferably 550° C. or more to 680° C. or less. The heat treatment time in this event can be 1 hour or more to 24 hours or less. Meanwhile, the Li silicate obtained by this method has some crystallinity but it cannot be said perfect.

Next, from the negative electrode active material particles, such a negative electrode active material particle is selected that the peak intensity A or the peak intensity C is the highest intensity and the peak intensity A and the peak intensity C satisfy the relationship of the formula 1 among the peak intensity A derived from $Li_2SiO_3$, the peak intensity B derived from Si, the peak intensity C derived from $Li_2Si_2O_5$, and the peak intensity D derived from $SiO_2$ which are obtained from the $^{29}Si$-MAS-NMR spectrum of the negative electrode active material particle. The $^{29}Si$-MAS-NMR spectrum may be measured under the above-described measurement conditions.

Note that the selection of the negative electrode active material particle does not have to be performed every time when the negative electrode active material is produced. Once the production condition with which the peak intensity A or the peak intensity C is the highest intensity and the peak intensity A and the peak intensity C satisfy the relationship of the formula 1 is found and selected, thereafter, the negative electrode active material can be produced with the same condition as the selected condition.

The negative electrode active material prepared in the way as mentioned above is mixed with other materials such as the negative electrode binder and the conductive assistant to obtain a negative electrode mixture. Then, an organic solvent, water, or the like is added thereto to obtain a slurry. Next, this slurry is applied onto the negative electrode current collector surface and then dried to form a negative electrode active material layer. At this time, a hot press or the like may be carried out as needed. In the way as mentioned above, the negative electrode can be produced.

<Lithium Ion Secondary Battery>

Next, a lithium ion secondary battery of the present invention will be explained. The lithium ion secondary battery of the present invention uses the negative electrode including the negative electrode active material of the present invention. Here, the laminate film type lithium ion secondary battery is taken as the specific example.

[Constitution of Laminate Film Type Lithium Ion Secondary Battery]

A laminate film type lithium ion secondary battery 20 shown in FIG. 2 mainly has a rolled electrode body 21 stored inside an exterior member 25 having a sheet form. This rolled body has a separator between a positive electrode and a negative electrode, and they are rolled. Alternatively, there is a case that a stacked body having the separator between the positive electrode and the negative electrode is stored. In both of the electrode bodies, a positive electrode lead 22 is attached to the positive electrode, and a negative electrode lead 23 is attached to the negative electrode. The outermost periphery of the electrode body is protected by a protection tape.

The positive- and negative electrode leads are led out, for example, in one direction from inside to outside of the exterior member 25. The positive electrode lead 22 is formed of a conductive material such as, for example, aluminum; and the negative electrode lead 23 is formed of a conductive material such as, for example, nickel or copper.

The exterior member 25 is a laminate film in which, for example, a melt-adhering layer, a metal layer, and a surface protection layer are stacked in this order. In the laminate film, the melt-adhering layers of two films are melt-adhered or adhered by an adhesive or the like to each other in the outer peripheral portions of the melt-adhering layers such that the melt-adhering layers may face to the electrode body 21. For example, the melt-adhering portion is a film of polyethylene, polypropylene, or the like, and the metal portion is an aluminum foil or the like. The protection layer is, for example, nylon or the like.

Between the exterior member 25 and the positive- and negative electrode leads, adhesion films 24 are inserted in order to prevent an outside air from invading. The material thereof is, for example, a polyethylene, polypropylene, or polyolefin resin.

[Positive Electrode]

The positive electrode has a positive electrode active material layer on both surfaces or one surface of a positive electrode current collector, for example, in the same way as the negative electrode 10 of FIG. 1.

The positive electrode current collector is formed of a conductive material such as, for example, aluminum.

The positive electrode active material layer includes one, or two or more of positive electrode materials which can adsorb and release a lithium ion, and may include other materials such as a binder, a conductive assistant, and a dispersant, depending on the design thereof. In this case, details of the binder and the conductive assistant are, for example, the same as those of the negative electrode binder and the negative electrode conductive assistant as described before.

The positive electrode material is preferably a lithium-containing compound. Illustrative example of the lithium-containing compound includes a composite oxide formed of lithium and a transition metal element, or a phosphoric acid compound having lithium and a transition metal element. Among these positive electrode materials, a compound having at least one or more of nickel, iron, manganese, and cobalt is preferable. These positive electrode materials are expressed by the chemical formula such as, for example, $Li_xM1O_2$ or $Li_yM2PO_4$. In the formulae, M1 and M2 represent at least one or more of transition metal elements. The values of x and y are different depending on the charge or discharge state of the battery; but they are generally represented by $0.05 \leq x \leq 1.10$ and $0.05 \leq y \leq 1.10$.

Illustrative example of the composite oxide having lithium and a transition metal element includes a lithium cobalt composite oxide ($Li_xCoO_2$), a lithium nickel composite oxide ($Li_xNiO_2$), and the like. Illustrative example of the phosphoric acid compound having lithium and a transition metal element includes a lithium iron phosphate compound ($LiFePO_4$), a lithium iron manganese phosphate compound ($LiFe_{1-u}Mn_uPO_4$ ($0<u<1$)), and the like. When these positive electrode materials are used, not only a high battery capacity but also an excellent cycle characteristics can be obtained.

[Negative Electrode]

The negative electrode has the same constitution as that of the negative electrode 10 for the lithium ion secondary battery shown in FIG. 1, thereby having, for example, the negative electrode active material layers 12 on both surfaces of the current collector 11. In this negative electrode, the negative electrode charge capacity is preferably greater than the electric capacity (charge capacity as the battery) obtained from the positive electrode active material. This is because deposition of the lithium metal on the negative electrode can be suppressed.

The positive electrode active material layers are arranged on part of both surfaces of the positive electrode current collector. The negative electrode active material layers are also arranged on part of both surfaces of the negative electrode current collector. In this case, for example, the negative electrode active material layer formed on the negative electrode current collector is provided with an area not facing to the positive electrode active material layer. This is for a stable battery design.

In the non-facing area, that is, the area in which the negative electrode active material layer does not face to the positive electrode active material layer, there is hardly an influence of charge and discharge. Because of this, the state of the negative electrode active material layer immediately after formation thereof can be maintained as it is. Accordingly, the composition, etc. of the negative electrode active material can be accurately and reproducibly investigated irrespective of charge and discharge.

[Separator]

The separator separates the negative electrode and the positive electrode, and allows for the lithium ion to pass therethrough while preventing the short circuit due to contacts of both the electrodes. This separator is formed of, for example, a porous film made of a synthetic resin or ceramic, or may have a stacked structure of two or more porous films.

Illustrative example of the synthetic resin includes polytetrafluoroethylene, polypropylene, polyethylene, and the like.

[Electrolytic Solution]

At least a part of the active material layer or the separator is impregnated with a liquid electrolyte (an electrolytic solution). In this electrolytic solution, an electrolyte salt is dissolved in a solvent, and other materials such as an additive may be also contained.

As the solvent, for example, a non-aqueous solvent may be used. Illustrative example of the non-aqueous solvent includes ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran, or the like. Among these, it is desirable to use at least one of ethylene carbonate, propylene carbonate, dimethyl carbonate, diethyl carbonate, and ethyl methyl carbonate. This is because better characteristics can be obtained. In this case, by using a high viscosity solvent such as ethylene carbonate or propylene carbonate in combination with a low viscosity solvent such as dimethyl carbonate, ethyl methyl carbonate, or diethyl carbonate, more advantageous characteristics can be obtained. This is because dissociation property and ion mobility of the electrolyte salt are improved.

In the case of using an alloy-based negative electrode, it is particularly desirable that at least one of a halogenated linear carbonic acid ester and a halogenated cyclic carbonic acid ester be contained as a solvent. This is because a stable coating film is formed on the surface of the negative electrode active material at the time of charge and discharge, particularly at the time of charging. The halogenated linear carbonic acid ester is a linear carbonic acid ester having a halogen as a constituent element (at least one hydrogen is substituted by the halogen). The halogenated cyclic carbonic acid ester is a cyclic carbonic acid ester having a halogen as a constituent element (at least one hydrogen is substituted by the halogen).

The kind of the halogen is not particularly limited, and fluorine is more preferable. This is because a coating film having better quality is formed than those by the other halogens. In addition, the number of the halogens is desirably as large as possible. This is because the obtained coating film is more stable and the decomposition reaction of the electrolyte solution is reduced.

Illustrative example of the halogenated linear carbonic acid ester includes fluoromethyl methyl carbonate, difluoromethyl methyl carbonate, and the like. Illustrative example of the halogenated cyclic carbonic acid ester includes 4-fluoro-1,3-dioxolan-2-one, 4,5-difluoro-1,3-dioxolan-2-one, and the like.

As a solvent additive, it is preferable to contain an unsaturated carbon bond cyclic carbonic acid ester. This is because a stable coating film is formed on the surface of the negative electrode at the time of charge and discharge, and the decomposition reaction of the electrolytic solution can be suppressed. Illustrative example of the unsaturated carbon bond cyclic carbonic acid ester includes vinylene carbonate, vinyl ethylene carbonate, and the like.

In addition, it is preferable to include a sultone (cyclic sulfonate ester) as the solvent additive. This is because a chemical stability of the battery is improved. Illustrative example of the sultone includes propane sultone and propene sultone.

Further, it is preferable that the solvent include an acid anhydride. This is because a chemical stability of the electrolytic solution is improved. Illustrative example of the acid anhydride includes propane disulfonic anhydride.

Illustrative example of the electrolyte salt can include any one or more of a light metal salt such as a lithium salt. Illustrative example of the lithium salt includes lithium hexafluorophosphate ($LiPF_6$), lithium terafluoroborate ($LiBF_4$), and the like.

The content of the electrolyte salt is preferably 0.5 mol/kg or more and 2.5 mol/kg or less based on the content of the solvent. This is because high ion conductivity can be obtained.

[Method for Producing Laminate Film Type Secondary Battery]

In the present invention, a negative electrode is produced by using the negative electrode active material produced by the method for producing the negative electrode active material of the present invention, and a lithium ion secondary battery is produced using the produced negative electrode.

At first, a positive electrode is produced by using the positive electrode material as mentioned above. First, a positive electrode active material is mixed, as needed, with a binder, a conductive assistant, etc. to obtain a positive electrode material mix, which is then dispersed into an organic solvent to obtain a slurry of the positive electrode mixture. Next, the mixture slurry is applied onto the positive electrode current collector by using a coating apparatus such as a die coater having a knife roll or a die head, and then dried by a hot air to obtain a positive electrode active material layer. Finally, the positive electrode active material layer is press molded with a roll press machine or the like. In this event, heating may be performed, or heating or pressing may be repeated plural times.

Next, by following the same operation procedure as production of the negative electrode 10 for the lithium ion secondary battery, the negative electrode active material layer is formed on the negative electrode current collector to obtain the negative electrode.

Upon producing the positive electrode and the negative electrode, the active material layer of each is formed on both surfaces of the positive- and negative electrode current collectors. At this time, the active material coating lengths on the both surface portions may differ from each other in any of the electrodes (see FIG. 1).

Next, an electrolytic solution is prepared. Then, by ultrasonic welding or the like, the positive electrode lead 22 is attached to the positive electrode current collector, and also the negative electrode lead 23 is attached to the negative electrode current collector as shown in FIG. 2. Subsequently, the positive electrode and the negative electrode are stacked or rolled with the separator therebetween to obtain the rolled electrode body 21. The protection tape is adhered to the outermost peripheral portion of the rolled electrode body 21. Next, the rolled body is molded into a flat form. Then, after the rolled electrode body is sandwiched by the folded exterior member 25 in a film form, the insulation portions of the exterior member are adhered to each other by a thermal adhesion method so as to seal the rolled electrode body with an open state only in one direction. The adhesion films are inserted between the exterior member and the positive electrode lead and between the exterior member and the negative electrode lead. A predetermined amount of the electrolytic solution previously prepared is charged from the open portion for vacuum impregnation. After the impregnation, the open portion is sealed by a vacuum thermal adhesion method. In the way as mentioned above, the laminate film type lithium ion secondary battery 20 can be produced.

EXAMPLES

Hereinafter, the present invention will be explained more specifically by showing Examples and Comparative Examples of the present invention; but the present invention is not limited to these Examples.

Example 1-1

According to the following procedure, the laminate film type lithium secondary battery 20 shown in FIG. 2 was produced.

First, a positive electrode was prepared. A positive electrode mixture was prepared by mixing 95% by mass of $LiNi_{0.7}Co_{0.25}Al_{0.05}O$, which is a lithium nickel cobalt aluminum composite oxide (NCA) and serves as a positive electrode active material, with 2.5% by mass of a positive electrode conductive assistant and 2.5% by mass of a positive electrode binder (polyvinylidene fluoride: PVDF). Next, the positive electrode mixture was dispersed into an organic solvent (N-methyl-2-pyrrolidone: NMP) to obtain a slurry in a paste form. Then, the slurry was applied onto both surfaces of the positive electrode current collector by using a coating apparatus having a die head, and dried with hot-air drying equipment. At this time, the positive electrode current collector used had a thickness of 20 μm. Finally, press molding was carried out with a roll press.

Next, a negative electrode was prepared. First, a negative electrode active material was prepared as follows. A mixture of metal silicon and silicon dioxide was introduced as the raw material into a reaction furnace. The mixture was vaporized in an atmosphere with the vacuum degree of 10 Pa and deposited onto an adsorbing plate. After sufficiently cooled, the deposited material was taken out and crushed with a ball mill. The x value of $SiO_x$ of the silicon compound particles thus obtained was 1.0. Then, the particle diameter of the silicon compound particles was adjusted by classification. Subsequently, the thermal decomposition CVD was carried out to cover the silicon compound particle surface with a carbon material. The carbon material had an average thickness of 100 nm.

Next, the silicon compound covered with the carbon material was reformed by inserting lithium into the silicon compound particles according to the oxidation-reduction method. In this case, first, the negative electrode active material particles were immersed in a solution (solution C) in which lithium pieces and an aromatic compound naphthalene had been dissolved in tetrahydrofuran (hereinafter referred to as THF). The solution C was prepared by dissolving naphthalene into a THF solvent at a concentration of 0.2 mol/L, and then adding lithium pieces with a mass content of 10% by mass to the mixture solution of THF and naphthalene. Moreover, when the negative electrode active material particles were immersed, the temperature of the solution was 20° C., and the immersion time was 20 hours. Thereafter, the negative electrode active material particles were collected by filtration. By the above-described treatments, lithium was inserted into the negative electrode active material particles.

Next, the negative electrode active material particles were washed. The washed silicon compound particles were heated under an Ar atmosphere. At this time, the heat treatment was performed at 600 degrees. The heat treatment time was 3 hours. By the above-described treatments, crystalline $Li_2SiO_3$ and $Li_2Si_2O_5$ were formed in the silicon compound particles.

Next, the $^{29}$Si-MAS-NMR spectrum of the negative electrode active material particles thus prepared was measured. FIG. 4 shows the $^{29}$Si-MAS-NMR spectrum of Example 1-1. In the $^{29}$Si-MAS-NMR spectrum, the base line was set, and peak intensities were calculated. The peak intensity A derived from $Li_2SiO_3$ was the highest peak. This satisfies that at least one of the peak intensities A and C derived from $Li_2SiO_3$ and $Li_2Si_2O_5$ is the highest peak. Note that A is the peak intensity appearing near −75 ppm; B, near −86 ppm; C, near −93 ppm; and D, near −110 ppm. As a relationship of the peak intensities, A=1.66C which satisfied (formula 1) C/3≤A≤3C. Moreover, A+C was 4.26 times B+D; the sum of A and C was a value four times or more as large as the sum of B and D. Further, B>D. Additionally, the crystallinity of the Li silicates in the negative electrode active material particles was confirmed by an X-ray diffraction. FIG. 5 shows a spectrum obtained by the X-ray diffraction. The peak appearing near 2θ=18.5° is derived from $Li_2SiO_3$, and the peak appearing near 2θ=24.6° is a peak derived from $Li_2Si_2O_5$.

Furthermore, from the negative electrode active material particles, the half-value width (2θ) of the diffraction peak attributable to the Si (111) crystal plane obtained by the X-ray diffraction using Cu-Kα ray was 2.26°, and the crystallite's size corresponding to the Si (111) crystal plane was 3.8 nm.

Furthermore, in the $^{29}$Si-MAS-NMR measurement, a peak was also obtained at a position in the vicinity of a chemical shift value of −130 ppm. Presumably, this peak is also the peak derived from amorphous silicon.

The negative electrode active material particles had a median diameter of 4 μm.

Here, to evaluate the stability of the aqueous slurry containing the negative electrode active material particles, 30 g of the prepared negative electrode mixture slurry was taken out as a portion separate from the slurry for preparing a secondary battery, and stored at 20° C. to measure the time after the negative electrode mixture slurry preparation until gas generation.

The negative electrode active material particles (silicon-based negative electrode active material) thus prepared and a carbon-based active material were blended with the mass ratio of 1:9 to prepare a negative electrode active material. Here, natural graphite and artificial graphite covered with a pitch layer were mixed with the mass ratio of 5:5 for use as the carbon-based active material. The carbon-based active material had a median diameter of 20 μm.

Next, the prepared negative electrode active material, a conductive assistant 1 (carbon nanotube, CNT), a conductive assistant 2 (carbon microparticles with a median diameter of about 50 nm), a styrene butadiene rubber (styrene butadiene copolymer, hereinafter referred to as SBR), carboxymethyl cellulose (hereinafter referred to as CMC) were mixed with the dry mass ratio of 92.5:1:1:2.5:3, and diluted with pure water to obtain a negative electrode mixture slurry. Note that the above SBR and CMC are negative electrode binders.

As the negative electrode current collector, an electrolytic copper foil having a thickness of 15 μm was used. This electrolytic copper foil included carbon and sulfur each at a concentration of 70 ppm by mass. Finally, the negative electrode mixture slurry was applied onto the negative electrode current collector and dried in a vacuum atmosphere at 100° C. for 1 hour. After the drying, the deposited amount (also referred to as area density) of the negative electrode active material layer per unit area on one surface of the negative electrode was 5 mg/cm².

Next, after solvents (4-fluoro-1,3-dioxolan-2-one (FEC), ethylene carbonate (EC), and dimethyl carbonate (DMC)) were mixed, an electrolyte salt (lithium hexafluorophosphate: $LiPF_6$) was dissolved therein to prepare an electrolytic solution. In this case, the solvent composition was FEC:EC:DMC=10:20:70 in terms of the volume ratio, and the content of the electrolyte salt in the solvents was 1.2 mol/kg.

Next, a secondary battery was fabricated as follows. First, an aluminum lead was welded to one end of the positive electrode current collector by ultrasonic, and a nickel lead was welded to one end of the negative electrode current collector. Then, the positive electrode, a separator, the negative electrode, and a separator were stacked in this order and rolled in the longitudinal direction to obtain a rolled electrode body. The roll end portion was fixed with a PET protection tape. As the separators, a laminate film (thickness: 12 μm) was used in which a film mainly containing porous polyethylene was sandwiched by films mainly containing porous polypropylene. Subsequently, after the electrode body was sandwiched by an exterior member, outer peripheral portions thereof were thermally adhered to each other except for one side, so that the electrode body was stored inside the exterior member. As the exterior member, an aluminum laminate film was used in which a nylon film, an aluminum foil, and a polypropylene film were stacked. Thereafter, from the open portion, the prepared electrolytic solution was charged for impregnation under a vacuum atmosphere. Then, the open portion was sealed by thermal adhesion.

The cycle characteristics and the first time charge and discharge characteristics of the secondary battery thus prepared were evaluated.

The cycle characteristics were examined as follows. First, in order to stabilize the battery, two cycles of charge and discharge were carried out at the atmospheric temperature of 25° C. with 0.2 C. The discharge capacity at the second cycle was measured. Next, the charge and discharge were carried out until the total cycle number reached 499 cycles, and the discharge capacity was measured at each cycle. Finally, the discharge capacity at the 500th cycle obtained with the 0.2 C charge and discharge was divided with the discharge capacity at the second cycle to calculate the capacity retention rate (hereinafter, also referred to as simply retention rate). In the normal cycle, that is, from the 3rd cycle to the 499th cycle, the charge and discharge were performed with the 0.7 C charge and the 0.5 C discharge.

In examining the first time charge and discharge characteristics, the first time efficiency (hereinafter, sometimes referred to as initial efficiency) was calculated. The first time efficiency was calculated from the equation shown by: first time efficiency (%)=(first time discharge capacity/first time charge capacity)×100. The atmosphere and temperature were the same as those used in the cycle characteristics examination.

Further, from the negative electrode prepared as described above and a counter lithium, a coin battery type test cell with the size of 2032 was fabricated; and the discharge behavior thereof was evaluated. More specifically, first, the constant current and constant voltage charging was carried out up to 0 V in the counter Li; and when the current density reached 0.05 $mA/cm^2$, the charge was stopped. Thereafter, the constant current discharge was carried out to 1.2 V. The current density at this time was 0.2 $mA/cm^2$. This charge and discharge was repeated for 30 times. From the data obtained in each charge and discharge, the graph was plotted where the capacity change rate (dQ/dV) is shown in the vertical axis and the voltage (V) is shown in the horizontal axis so as to check whether or not a peak was obtained in the range of 0.4 to 0.55 (V). As a result, within 30 times of the charge and discharge, the peak was obtained in the range of 0.4 to 0.55 (V). Moreover, the peak was obtained in every charge and discharge from the charge and discharge in which the peak was observed for the first time till the 30th charge and discharge. Hereinafter, this peak is also referred to as dQ/dV peak.

Further, the first time efficiency of the silicon-based active material alone (SiOx alone) was calculated as follows. First, the negative electrode active material particles (the silicon active material particles covered with the carbon material) prepared above and polyacrylic acid were mixed with the mass ratio of 85:15. This mixture was applied onto a copper foil. At this time, the area density of the applied mixture was about 2 $mg/cm^2$. Then, the resultant was vacuum dried at 90° C. for 1 hour. Then, the constant current and constant voltage charging was started with a voltage of 0 V and a current density of 0.2 $mA/cm^2$ using the counter Li in a coin battery with the size of 2032. Subsequently, when the current value reached 0.1 mA, the constant current and constant voltage charging was stopped. Thereafter, the constant current discharge was carried out, and the discharge was stopped when the voltage reached 1.2 V. The current density during the discharging was the same as that during the charging. At this time, the first time efficiency of the silicon-based active material alone (SiOx alone) is: (discharge capacity)/(charge capacity)×100(%), given that the condition for inputting Li to the negative electrode represents the charge, and the condition for taking out Li from the negative electrode represents the discharge. Using this formula, the first time efficiency of SiOx alone was calculated. As a result, the first time efficiency of SiOx alone was about 86%.

Example 1-2

A secondary battery was fabricated under the same conditions as in Example 1-1, except that the amount of Li inserted during the Li doping was smaller than that in Example 1-1. Then, the cycle characteristics, first time efficiency, and slurry stability were evaluated. The negative electrode active material prepared in Example 1-2 exhibited the following properties.

The silicon compound particles included crystalline $Li_2SiO_3$ and $Li_2Si_2O_5$. Here, FIG. 6 shows the $^{29}$Si-MAS-NMR spectrum of Example 1-2. As a relationship of the peak intensities, A=1.49C which satisfied (formula 1) C/3≤A≤3C. Moreover, A+C was 1.55 times B+D; and D>B. Further, a peak was also obtained at a position in the vicinity of a chemical shift value of −130 ppm.

Examples 1-3, 1-4

Secondary batteries were fabricated as in Example 1-1, except that the heat treatment temperature was changed to control the peak intensities A and C so as to satisfy the relationship of the formula 1 as shown in Table 1. The heat treatment temperature in Example 1-3 was 500° C., and the heat treatment temperature in Example 1-4 was 680° C. The heat treatment time was 3 hours in both Examples 1-3 and 1-4. Note that Examples 1-3, 1-4 satisfied that at least one of the peak intensities A and C is the highest peak, and the relationships between A and C in Examples 1-3, 1-4 were respectively A=3C and A=C/3. In Examples 1-3 and 1-4, B>D, and the sum of A and C was 4.6 times as large as the sum of B and D in Example 1-3, while 4.52 times in Examples 1-4. Further, a peak was also obtained at a position in the vicinity of a chemical shift value of −130 ppm.

Comparative Example 1-1

In Comparative Example 1-1, the silicon compound particles covered with the carbon material before the Li insertion in Example 1-1 were used as a silicon-based negative electrode active material, and mixed with the carbon-based active material as in Example 1-1 to prepare a negative electrode active material. Next, a secondary battery was fabricated by the same method as in Example 1-1, except that this negative electrode active material was used. Then, the cycle characteristics, first time efficiency, and slurry stability were evaluated. FIG. 7 shows the $^{29}$Si-MAS-NMR spectrum of Comparative Example 1-1. As can be seen from FIG. 7, the peak intensity D derived from $SiO_2$ is the highest. In addition, it was impossible to determine the relationship between A and C. Note that, in Comparative Example 1-1, the initial efficiency of the SiO material alone was calculated as in Example 1-1 and was about 70%.

Comparative Example 1-2

In Comparative Example 1-2, a secondary battery was fabricated by the same method as in Example 1-1, except that the heat treatment was not performed after the Li insertion. Then, the cycle characteristics, first time efficiency, and slurry stability were evaluated. FIG. 8 shows the $^{29}$Si-MAS-NMR spectrum of Comparative Example 1-2. As can be seen from FIG. 8, the peak intensity B derived from Si is the highest. In addition, it was impossible to determine the relationship between A and C.

Comparative Example 1-3

A secondary battery was fabricated as in Example 1-1, except that the heat treatment temperature was changed to control the peak intensities A and C so as not to satisfy the relationship of the formula 1. The heat treatment temperature in Comparative Example 1-3 was 450° C. Note that, in Comparative Example 1-3, the peak intensity A is the highest peak, and A=5.62C.

Comparative Example 1-4

A secondary battery was fabricated as in Example 1-1, except that the heat treatment temperature was changed to control the peak intensities A and C so as not to satisfy the relationship of the formula 1. The heat treatment temperature in Comparative Example 1-4 was 720° C. Note that, in Comparative Example 1-4, the peak intensity C is the highest peak, and A=0.11C.

Table 1 shows the results of Examples 1-1 to 1-4 and Comparative Examples 1-1 to 1-4. In the subsequent tables, the symbol "○" means the corresponding criterion is satisfied, and the symbol "×" means the criterion is not satisfied.

TABLE 1

| | SiOx: x = 1.0 and 10% by mass, current collector: Cu (including carbon and sulfur), positive electrode: NCA, carbon material: 100 nm, dQ/dV: present | | | | | | | | | |
|---|---|---|---|---|---|---|---|---|---|---|
| | Peak intensity A or C is highest | A + C is 4 times or more B + D | Peak at −130 ppm | Whether formula 1 is satisfied | D < B | Half − value width 2Θ (°) | Si (111) crystallite size (nm) | Cycle retention rate (%) | Initial efficiency (%) | Time until gas generation (hours) |
| Comparative Example 1-1 | × | × | impossible to determine | impossible to determine | × | 2.59 | 3.3 | 81 | 84 | stable |
| Comparative Example 1-2 | × | × | present | impossible to determine | ○ | 2.59 | 3.3 | 81.9 | 89 | 6 |
| Comparative Example 1-3 | ○ | ○ (6.38 times) | present | × (A = 5.62C) | ○ | 2.59 | 3.3 | 83.8 | 89.3 | 24 |
| Comparative Example 1-4 | ○ | ○ (6 times) | present | × (A = 0.11C) | ○ | 1.85 | 4.6 | 77.4 | 90.2 | 120 |
| Example 1-1 | ○ | ○ (4.26 times) | present | ○ (A = 1.66C) | ○ | 2.26 | 3.8 | 83.5 | 90.3 | 96 |
| Example 1-2 | ○ | × (1.55 times) | present | ○ (A = 1.49C) | ○ | 1.84 | 4.6 | 78.8 | 87.4 | 120 |
| Example 1-3 | ○ | ○ (4.6 times) | present | ○ (A = 3C) | ○ | 2.47 | 3.5 | 81.9 | 89.1 | 48 |
| Example 1-4 | ○ | ○ (4.52 times) | present | ○ (A = C/3) | ○ | 2.04 | 4.1 | 80.2 | 89.5 | 120 |

As can be seen from Table 1, in comparison with Comparative Examples 1-2 and 1-3, the time after the slurry preparation until the gas generation was long in Examples 1-1 to 1-4 which satisfied the formula 1. This revealed that the slurry stability was high. In addition, since the formula 1 was satisfied, the amounts of $Li_2SiO_3$ and $Li_2Si_2O_5$ were well balanced, and the slurry stability was high. Further, the cycle retention rate and initial efficiency were also favorable. These suggest that the battery characteristics were improved.

On the other hand, since Li was not inserted in Comparative Example 1-1, the slurry stability is high, but the initial efficiency is very low. In Comparative Example 1-1, the negative electrode active material obtained by mixing 90% by mass of the carbon-based active material with 10% by mass of the silicon-based active material was used in the battery evaluation, and the initial efficiency was calculated. When the initial efficiency was converted to that of the silicon-based active material alone (SiOx alone), the initial efficiency of the SiOx alone was about 70% in Comparative Example 1-1. For example, in Example 1-2, the initial efficiency of the SiOx alone is about 85%, and the initial efficiency of the SiOx alone in Comparative Example 1-1 is much lower than that in Example. Meanwhile, in Comparative Example 1-2, the initial efficiency and cycle characteristics were improved, but the slurry stability was low and not suitable for industrial use.

In Comparative Example 1-3, A=5.62C. This A is much larger than C in contrast to the case of satisfying the formula 1. Hence, although the cycle characteristics were improved, the water resistance was decreased in comparison with Examples. The cycle characteristics and water resistance are better balanced in Examples 1-1 to 1-4 in which A and C were well balanced.

In Comparative Example 1-4, A=0.11C. This A is smaller than C in contrast to the case of satisfying the formula 1. Hence, although the water resistance was improved, the cycle characteristics were decreased in comparison with Examples. The cycle characteristics and water resistance are better balanced in Examples 1-1 to 1-4 in which A and C were well balanced.

Examples 2-1 to 2-3, Comparative Examples 2-1, 2-2

Secondary batteries were fabricated as in Example 1-1, except that the oxygen amount in the bulk of the silicon compound was adjusted. In this case, the oxygen amount was adjusted by changing the heating temperature and the ratio of the metal silicon and the silicon dioxide in the raw material of the silicon compound. Table 2 shows the values of x of the silicon compound shown by $SiO_x$ in Examples 2-1 to 2-3 and Comparative Examples 2-1, 2-2. Note that, in Examples 2-1 to 2-3, A or C was the highest peak intensity, and these A and C satisfied the formula 1.

TABLE 2

SiOx: $D_{50}$ = 4 μm and 10% by mass, current collector: Cu (including carbon and sulfur) positive electrode: NCA, carbon material: 100 nm.

| | X | A + C is 4 times or more B + D | dQ/dV peak | cycle retention rate (%) | Initial efficiency (%) | Time until gas generation (hours) |
|---|---|---|---|---|---|---|
| Example 1-1 | 1 | 4 times or more | present | 83.5 | 90.3 | 96 |
| Comparative Example 2-1 | 0.3 | impossible to determine | absent | 60 | 92.3 | 48 |
| Example 2-1 | 0.5 | 4 times or more | absent | 76 | 91.2 | 72 |
| Example 2-2 | 0.7 | 4 times or more | present | 80 | 90.4 | 96 |
| Example 2-3 | 1.5 | 4 times or more | present | 83 | 89.8 | 120 |
| Comparative Example 2-2 | 1.8 | 4 times or more | present | — | — | 120 |

As shown in Table 2, when the value of x in the silicon compound shown by SiOx was within a range of 0.5≤x≤1.6, the battery characteristics were further improved. When oxygen is not sufficient (x=0.3) as in Comparative Example 2-1, the first time efficiency is improved, but the capacity retention rate remarkably deteriorates. Moreover, when oxygen is not sufficient as in this case, the $SiO_2$ content is so low that the Li silicates are not sufficiently formed, making it impossible to determine the peaks of A and C. On the other hand, as represented by Comparative Example 2-2, when the oxygen amount is large (x=1.8), lithium is hardly adsorbed and released due to the excessive amount of oxygen, and substantially the capacity of the silicon oxide was not expressed. Hence, the evaluation was stopped.

Examples 3-1, 3-2

Secondary batteries were fabricated as in Example 1-1, except that the heat treatment temperature was changed to control the peak intensities A and C as shown in Table 3. Note that Examples 3-1, 3-2 satisfied that at least one of the peak intensities A and C is the highest peak. The relationships between A and C in Examples 3-1, 3-2 were respectively A=0.62C and A=2.2C.

Comparative Examples 3-1, 3-2

Secondary batteries were fabricated as in Example 1-1, except that the heat treatment temperature was changed to control the peak intensities A and C so as not to satisfy the formula 1. Note that, in Comparative Examples 3-1, 3-2, at least one of the peak intensities A and C is the highest peak, but the relationships between A and C in Comparative Examples 3-1, 3-2 were respectively A=0.21C and A=5C.

TABLE 3

SiOx: x = 1, $D_{50}$ = 4 μm, and 10% by mass, current collector: Cu (including carbon and sulfur) A or C being the highest: satisfied, A + C ≥ 4(B + D): satisfied, B > D: satisfied, positive electrode: NCA, carbon material: 100 nm, dQ/dV peak: present, −130 ppm peak: present.

| Table 3 | Whether formula 1 is satisfied | Cycle retention rate (%) | Initial efficiency (%) | Time until gas generation (hours) |
|---|---|---|---|---|
| Example 1-1 | ○ (A = 1.66C) | 83.5 | 90.3 | 96 |
| Example 3-1 | ○ (A = 0.62C) | 82.5 | 90.1 | 96 |
| Example 3-2 | ○ (A = 2.2C) | 82.7 | 89.8 | 96 |
| Comparative Example 3-1 | × (A = 0.21C) | 76.7 | 90.4 | 120 |
| Comparative Example 3-2 | × (A = 5C) | 84.1 | 89.6 | 36 |

As seen from the results in Table 3, in Examples 1-1, 3-1, 3-2 which satisfied the formula 1, the amounts of $Li_2SiO_3$ and $Li_2Si_2O_5$ were well balanced, and the slurry stability was high. Further, the cycle retention rate and initial efficiency were also favorable. These suggest that the battery characteristics were improved.

On the other hand, in Comparative Example 3-1, A=0.21C. This A is smaller than C in contrast to the case of satisfying the formula 1. Hence, although the water resistance was improved, the cycle characteristics were decreased in comparison with Examples 1-1, 3-1, 3-2. The cycle characteristics and water resistance are better balanced in Examples 1-1, 3-1, 3-2 in which A and C were well balanced.

In Comparative Example 3-2, A=5C. This A is much larger than C in contrast to the case of satisfying the formula 1. Hence, although the cycle characteristics were improved, the water resistance was decreased in comparison with Examples 1-1, 3-1, 3-2. The cycle characteristics and water resistance are better balanced in Examples 1-1, 3-1, 3-2 in which A and C were well balanced.

(Examples 4-1 to 4-4)

Secondary batteries were fabricated under the same conditions as in Example 1-1, except that the crystallinity of the silicon compound particles was changed as shown in Table 4. Then, the cycle characteristics and first time efficiency were evaluated. Note that the crystallinity in the silicon compound particles can be controlled by changing the vaporization temperature of the raw material, or a heat treatment after the formation of the silicon compound particles.

TABLE 4

SiOx: x = 1, $D_{50}$ = 4 μm, and 10% by mass, current collector: Cu (including carbon and sulfur) A or C being the highest: satisfied, formula 1: satisfied, A + C ≥ 4 (B + D): satisfied, B > D: satisfied, positive electrode: NCA, carbon material: 100 nm, dQ/dV peak: present, −130 ppm peak: present

|  | Peak intensity A or C is highest | Half-value width 2Θ (°) | Si (111) crystallite size (nm) | Cycle retention rate (%) | Initial efficiency (%) | Time until gas generation (hours) |
|---|---|---|---|---|---|---|
| Example 1-1 | ○ | 2.26 | 3.8 | 83.5 | 90.3 | 96 |
| Example 4-1 | ○ | 1.76 | 4.85 | 80.1 | 90.5 | 120 |
| Example 4-2 | ○ | 1.22 | 7.19 | 78.2 | 90.6 | 120 |
| Example 4-3 | ○ | 1.03 | 8.57 | 76.9 | 90.9 | 120 |
| Example 4-4 | ○ | 0.80 | 10.8 | 74.8 | 91.1 | 120 |

The capacity retention rate and first time efficiency were changed depending on the crystallinity of the silicon compound particles. Especially, high capacity retention rates were obtained from low crystallinity materials in which the half-value width was 1.2° or more and the crystallite's size attributable to the Si (111) plane was 7.5 nm or less.

Examples 5-1 to 5-5

Secondary batteries were fabricated under the same conditions as in Example 1-1, except that the median diameter of the negative electrode active material particles was changed as shown in Table 5. Then, the cycle characteristics and first time efficiency were evaluated.

TABLE 5

SiOx: x = 1 and 10% by mass, current collector: Cu (including carbon and sulfur) A or C being the highest: satisfied, formula 1: satisfied, A + C ≥ 4(B + D): satisfied, B > D: satisfied, positive electrode: NCA, carbon material: 100 nm, dQ/dV peak: present, −130 ppm peak: present

| Table 5 | Median diameter (μm) | Cycle retention rate (%) | Initial efficiency (%) | Time until gas generation (hours) |
|---|---|---|---|---|
| Example 1-1 | 4 | 83.5 | 90.3 | 96 |
| Example 5-1 | 0.5 | 76.2 | 89.2 | 48 |
| Example 5-2 | 1 | 80.1 | 89.4 | 72 |
| Example 5-3 | 10 | 84.3 | 90.4 | 120 |
| Example 5-4 | 15 | 80.2 | 90.7 | 144 |
| Example 5-5 | 20 | 77.4 | 88.0 | 144 |

When the median diameter of the negative electrode active material particles was 1.0 μm or more, the cycle retention rate and the slurry stability were improved. This is presumably because the surface area of the negative electrode active material particle per a unit mass was not too large so that the area to cause a side reaction was successfully made small. On the other hand, when the median diameter is 15 μm or less, the particle does not easily crack upon charging so that SEI (solid electrolyte interface) due to the new surface is difficult to be formed upon charging and discharging. Thus, the reversible Li loss can be suppressed. In addition, when the median diameter of the negative electrode active material particles is 15 μm or less, expansion amount of the negative electrode active material particles upon charging is not so much that physical and electrical destruction of the negative electrode active material layer due to expansion can be prevented.

Examples 6-1 to 6-5

Secondary batteries were fabricated under the same conditions as in Example 1-1, except that the average thickness of the carbon material covering the surfaces of the silicon compound particles was changed. Then, the cycle characteristics and first time efficiency were evaluated. The average thickness of the carbon material can be adjusted by changing the CVD conditions.

TABLE 6

SiOx: x = 1, $D_{50}$ = 4 µm, and 10% by mass, current collector: Cu (including carbon and sulfur) A or C being the highest: satisfied, formula 1: satisfied, A + C ≥ 4(B + D): satisfied, B > D: satisfied, positive electrode: NCA, dQ/dV peak: present, −130 ppm peak: present

| Table 6 | Carbon material average thickness (nm) | Cycle retention rate (%) | Initial efficiency (%) | Time until gas generation (hours) |
|---|---|---|---|---|
| Example 1-1 | 100 | 83.5 | 90.3 | 96 |
| Example 6-1 | 0 | 76 | 88.7 | 48 |
| Example 6-2 | 5 | 80 | 90.0 | 72 |
| Example 6-3 | 500 | 82.9 | 90.4 | 96 |
| Example 6-4 | 1000 | 83.4 | 90.1 | 96 |
| Example 6-5 | 5000 | 83.2 | 89.9 | 96 |

As can be seen from Table 6, when the average thickness of the carbon material is 5 nm or more, the conductivity is especially improved. Thus, the capacity retention rate and initial efficiency can be improved. On the other hand, when the average thickness of the carbon material is 5000 nm or less, a sufficient amount of the silicon compound particles can be ensured in the battery design, so that the battery capacity is not decreased.

Example 7-1

A secondary battery was fabricated under the same conditions as in Example 1-1, except that an electrolytic copper foil including no carbon and sulfur elements was used as the negative electrode current collector. Then, the cycle characteristics and first time efficiency were evaluated.

TABLE 7

SiOx: x = 1, $D_{50}$ = 4 µm, and 10% by mass, current collector: Cu A or C being the highest: satisfied, formula 1: satisfied, A + C ≥ 4(B + D): satisfied, B > D: satisfied, positive electrode: NCA, carbon material: 100 nm, dQ/dV peak: present, −130 ppm peak: present

| Table 7 | Presence or absence of carbon and sulfur elements in copper foil | Cycle retention rate (%) | Initial efficiency (%) | Time until gas generation (hours) |
|---|---|---|---|---|
| Example 1-1 | present (70 ppm) | 83.5 | 90.3 | 96 |
| Example 7-1 | absent | 80.4 | 90.2 | 96 |

When the negative electrode current collector includes carbon and sulfur each in an amount of 70 ppm by mass or less, the strength of the current collector is improved. Thus, in a case of using a silicon-based negative electrode active material which largely expands and contracts during charge and discharge of the secondary battery, it is possible to suppress the deformation and distortion of the current collector due to such expansion and contraction, and the cycle characteristics are further improved as in Example 1-1.

Example 8-1

Secondary batteries were fabricated under the same conditions as in Example 1-3, except that the ratio of the mass of the silicon-based active material particles in the negative electrode active material was changed. Then, the percent increase in the battery capacity (initial capacity) was evaluated.

Comparative Example 8-1

Secondary batteries were fabricated under the same conditions as in Comparative Example 1-1, except that the ratio of the mass of the silicon-based active material particles in the negative electrode active material was changed. Then, the percent increase in the battery capacity was evaluated. Specifically, the silicon-based active material particles used here were not subjected to any of the Li insertion and the subsequent heat treatment. The percent increase in the battery capacity was calculated on the basis that the ratio of the silicon-based active material particles was 0% by mass (i.e., the carbon active material was 100% by mass).

Table 8 shows a relationship between the ratio of the silicon-based active material particles relative to the total amount of the negative electrode active material and the percent increase in the battery capacity of the secondary battery.

TABLE 8

| Table 8 Ratio of silicon-based active material particles (% by mass) | Percent increase in battery capacity (%) | |
|---|---|---|
| | Example 8-1 | Comparative Example 8-1 |
| 0 | 0 | 0 |
| 10 | 8.3 | 7.2 |
| 20 | 17.1 | 11.4 |
| 30 | 23 | 14.0 |

As can be seen from Table 8, when the ratio of the silicon compound was 10% by mass or more, the difference in the percent increase in the battery capacity was widened between Example 8-1 and Comparative Example 8-1. Thus, it was verified that when the ratio of the silicon compound in the battery of the present invention is 10% by mass or more, the energy density per volume of the battery is especially remarkably increased.

It should be noted that the present invention is not restricted to the above-described embodiments. The embodiments are merely examples so that any embodiments that have substantially the same feature and demonstrate the same functions and effects as those in the technical concept as disclosed in claims of the present invention are included in the technical scope of the present invention.

The invention claimed is:
1. A negative electrode active material comprising a negative electrode active material particle, wherein
the negative electrode active material particle comprises a silicon compound particle comprising a silicon compound ($SiO_x$: 0.5≤x≤1.6),
the silicon compound particle comprises crystalline $Li_2SiO_3$ and $Li_2Si_2O_5$ in at least part of the silicon compound particle,
among a peak intensity A derived from $Li_2SiO_3$, a peak intensity B derived from Si, a peak intensity C derived from $Li_2Si_2O_5$, and a peak intensity D derived from $SiO_2$ which are obtained from a $^{29}Si$-MAS-NMR spectrum of the silicon compound particle, the peak intensity A or the peak intensity C is the highest intensity, and
the peak intensity A and the peak intensity C satisfy a relationship of the following formula 1,

$$C/3 \leq A \leq 3C \quad \text{formula 1:}$$

2. The negative electrode active material according to claim 1, wherein a sum of the peak intensity A and the peak intensity C takes a value four times or more as large as a sum of the peak intensity B and the peak intensity D in the $^{29}$Si-MAS-NMR spectrum.

3. The negative electrode active material according to claim 1, wherein the peak intensity B is higher than the peak intensity D in the $^{29}$Si-MAS-NMR spectrum.

4. The negative electrode active material according to claim 1, wherein a peak that is derived from amorphous silicon appears in a region near a chemical shift value of −130 ppm in the $^{29}$Si-MAS-NMR spectrum.

5. The negative electrode active material according to claim 1, wherein
in the negative electrode active material,
a half-value width (2θ) of a diffraction peak attributable to a Si (111) crystal plane obtained by an X-ray diffraction using Cu-Kα ray is 1.2° or more, and
a crystallite's size corresponding to the crystal plane is 7.5 nm or less.

6. The negative electrode active material according to claim 1, wherein
a test cell is prepared, the test cell comprising a counter lithium and a negative electrode, which comprises a mixture of the negative electrode active material and a carbon-based active material;
in the test cell, charge in which a current is flowed so as to insert lithium into the negative electrode active material and discharge in which a current is flowed so as to release lithium from the negative electrode active material are executed for 30 times; and
when a graph is drawn showing a relationship between an electric potential V of the negative electrode and a differential value dQ/dV, which is obtained by differentiating a discharge capacity Q in each charge and discharge with the electric potential V with a standard of the counter lithium, the differential value dQ/dV upon discharging on and after Xth time (1≤X≤30) has a peak in a range of 0.40 V to 0.55 V of the electric potential V of the negative electrode.

7. The negative electrode active material according to claim 1, wherein the negative electrode active material particles have a median diameter of 1.0 μm or more and 15 μm or less.

8. The negative electrode active material according to claim 1, wherein the negative electrode active material particle contains a carbon material at a surface layer portion.

9. The negative electrode active material according to claim 8, wherein the carbon material to be coated has an average thickness of 5 nm or more and 5000 nm or less.

10. A mixed negative electrode active material comprising:
the negative electrode active material according to claim 1; and
a carbon-based active material.

11. The mixed negative electrode active material according to claim 10, wherein a ratio of the negative electrode active material relative to a total amount of the mixed negative electrode active material is 10% by mass or more.

12. A method for producing a negative electrode active material which comprises a negative electrode active material particle comprising a silicon compound particle, the method comprising the steps of:
making silicon compound particles comprising a silicon compound ($SiO_x$: 0.5≤x≤1.6);
inserting lithium into the silicon compound particles so as to include crystalline $Li_2SiO_3$ and $Li_2Si_2O_5$ in at least part of the silicon compound particles to prepare negative electrode active material particles;
selecting, from the negative electrode active material particles, such a negative electrode active material particle that, among a peak intensity A derived from $Li_2SiO_3$, a peak intensity B derived from Si, a peak intensity C derived from $Li_2Si_2O_5$, and a peak intensity D derived from $SiO_2$ which are obtained from a $^{29}$Si-MAS-NMR spectrum of the negative electrode active material particle, the peak intensity A or the peak intensity C is the highest intensity, and the peak intensity A and the peak intensity C satisfy a relationship of the following formula 1, $$C/3 \leq A \leq 3C \qquad \text{formula 1:}$$

and
producing a negative electrode active material by using the selected negative electrode active material particle.

13. The method according to claim 12, wherein the inserting lithium includes mixing the silicon compound particles with a solution containing dissolved lithium metal.

14. The method according to claim 12, further comprising, before the selecting, heating the negative electrode active material particles at a heat treatment temperature in a range of 500° C. or more and 680° C. or less.

* * * * *